(12) United States Patent
Murphy et al.

(10) Patent No.: US 11,288,258 B2
(45) Date of Patent: Mar. 29, 2022

(54) DEDICATED AUDIT PORT FOR IMPLEMENTING RECOVERABILITY IN OUTPUTTING AUDIT DATA

(71) Applicant: Ab Initio Technology LLC, Lexington, MA (US)

(72) Inventors: Trevor Murphy, Singapore (SG); Paul Veiser, Singapore (SG)

(73) Assignee: Ab Initio Technology LLC, Lexington, MA (US)

( * ) Notice: Subject to any disclaimer, the term of this patent is extended or adjusted under 35 U.S.C. 154(b) by 108 days.

(21) Appl. No.: 16/582,319

(22) Filed: Sep. 25, 2019

(65) Prior Publication Data

US 2020/0183913 A1 Jun. 11, 2020

Related U.S. Application Data

(60) Provisional application No. 62/736,259, filed on Sep. 25, 2018.

(51) Int. Cl.
*G06F 16/00* (2019.01)
*G06F 16/23* (2019.01)
(Continued)

(52) U.S. Cl.
CPC .......... *G06F 16/2365* (2019.01); *G06F 9/466* (2013.01); *G06F 11/1469* (2013.01); *G06F 16/2456* (2019.01); *G06F 16/9024* (2019.01); *G06F 2201/82* (2013.01); *G06Q 10/10* (2013.01)

(58) Field of Classification Search
CPC .................................................. G06F 16/2365
See application file for complete search history.

(56) References Cited

U.S. PATENT DOCUMENTS 5,966,072 A  10/1999  Stanfill et al.
7,164,422 B1  1/2007  Wholey, III et al.
(Continued)

FOREIGN PATENT DOCUMENTS

AU  2016200107  11/2017

OTHER PUBLICATIONS

PCT International Search Report and Written Opinion in International Appln. No. PCT/US2019/052882, dated Mar. 23, 2020, 14 pages.

(Continued)

*Primary Examiner* — Ajith Jacob
(74) *Attorney, Agent, or Firm* — Fish & Richardson P.C.

(57) ABSTRACT

A method implemented by a data processing system including: executing a dataflow graph that includes the plurality of components and the links, with a given component of the plurality including an input port, an audit port and an output port; processing, by the dataflow graph with the components and the links, the one or more data records representing the transaction, wherein the at least one of the components saves a state specifying one or more input records that are processed by the at least one of the components; when an error occurs during processing of one or more input records by the given component, restoring a state of the at least one of the components to the saved state; and based on the restored state, recovering at least some of the audit data for the given component of the dataflow graph.

20 Claims, 20 Drawing Sheets

(51) Int. Cl.
*G06F 16/2455* (2019.01)
*G06F 16/901* (2019.01)
*G06F 9/46* (2006.01)
*G06F 11/14* (2006.01)
*G06Q 10/10* (2012.01)

(56) References Cited

U.S. PATENT DOCUMENTS

| | | | |
|---|---|---|---|
| 7,877,350 | B2 | 1/2011 | Stanfill et al. |
| 8,706,667 | B2 | 4/2014 | Stanfill et al. |
| 10,108,521 | B2 | 10/2018 | Buxbaum et al. |
| 2009/0030863 | A1* | 1/2009 | Stanfill ................ G06F 9/4494 706/45 |
| 2009/0271504 | A1* | 10/2009 | Ginter ................ H04L 41/0806 709/220 |
| 2009/0327196 | A1 | 12/2009 | Studer et al. |
| 2012/0054255 | A1* | 3/2012 | Buxbaum ................ G06F 9/50 708/235 |
| 2012/0216073 | A1* | 8/2012 | Douros ................ G06F 9/485 714/19 |
| 2014/0273930 | A1* | 9/2014 | Rossi ................ H04M 15/43 455/406 |
| 2016/0342396 | A1 | 11/2016 | Kukolich et al. |
| 2017/0177446 | A1 | 6/2017 | MacLean et al. |
| 2019/0026210 | A1 | 1/2019 | Buxbaum et al. |
| 2019/0146763 | A1 | 5/2019 | Gould |

OTHER PUBLICATIONS

PCT International Preliminary Report on Patentability in International Appln. No. PCT/US2019/052882, dated Apr. 8, 2021, 12 pages.

* cited by examiner

DEDICATED AUDIT PORT FOR IMPLEMENTING RECOVERABILITY IN OUTPUTTING AUDIT DATA

CLAIM OF PRIORITY

This application claims priority under 35 U.S.C. § 119(e) to U.S. Patent Application Ser. No. 62/736,259, filed on Sep. 25, 2018, the entire contents of which are hereby incorporated by reference.

TECHNICAL FIELD

The present description relates to computer-implemented methods, data processing systems and machine-readable hardware storage devices for generating logs from execution of executable logic that is currently applied to data items in a stream of data items, e.g., data items coming in via a network connection from networked applications.

BACKGROUND

A log records either events that occur in an operating system or other software runs, or messages between different users of a communication software.

SUMMARY

In some implementations, a method implemented by a data processing system for executing a dataflow graph that processes one or more data records representing a transaction, with the dataflow graph including a plurality of components and links, with a component representing a computation applied to one or more input records to process the one or more input records, with an input record having a specified relationship to the one or more data records representing the transaction, and with the links connecting the components and representing flows of data among the components, the method including: executing the dataflow graph that includes the plurality of components and the links, with a given component of the plurality including an input port, an audit port and an output port; wherein the input port is for receiving one or more input records with a specified relationship to the one or more data records representing the transaction; wherein the audit port is for providing audit data describing at least a portion of the transaction; wherein the output port is for providing one or more output records; wherein at least one of the components is configured to execute prior to execution of the given component; processing, by the dataflow graph with the components and the links, the one or more data records representing the transaction, wherein the at least one of the components saves a state specifying one or more input records that are processed by the at least one of the components; when an error occurs during processing of one or more input records by the given component, restoring a state of the at least one of the components to the saved state; and based on the restored state, recovering at least some of the audit data for the given component of the dataflow graph; providing, on the audit port, the at least some of the recovered audit data describing at least the portion of the transaction; and providing, on the output port, the one or more output records. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some implementations, the recovered audit data is first audit data, the audit port is a first audit port, the given component is a first component, and wherein the method further includes: at a specified time interval, joining the first audit data with second audit data output on a second audit port of a second component. The given component is a first component, the recovered audit data is first audit data, and wherein the method further includes: executing the first component on a first data processing system; executing a second component of the dataflow graph on a second data processing system; and receiving, on a third data processing system, the recovered audit data and second audit data output from a second audit port of the second component. In some implementations, the method further includes storing in memory the received recovered and second audit data; and dynamically generating, from the stored audit data, one or more metrics. In some implementations, the method further includes aggregating data from first and second audit data; and storing that aggregated data. In some implementations, the method further includes classifying the recovered audit data by assigning the recovered audit data to a particular classification; and generating, from audit data assigned to the particular classification, audit metrics indicative of a user's interaction with a particular campaign.

In other implementations, in response to the occurrence of the error, the given component outputs, on an error log port, an error log, which includes the state of the at least one of the plurality of components and specifies which one or more of the input records were last successfully processed by the at least one of the plurality of components, wherein the state specifies which of the components last successfully finished processing. In still other implementations, the given component outputs the error log to an error handler component, wherein the error handler component transmits to a rollback component a message based on the error log, and wherein the rollback component, using the message, returns a state of the dataflow graph to a state in which the at least one of the plurality of components is being executed and in which the one or more of the input records that were last successfully processed by the at least one of the plurality of components are being processed by the at least one of the plurality of components.

All or part of the foregoing may be implemented as a computer program product including instructions that are stored on one or more non-transitory machine-readable storage media and/or one or more computer-readable hardware storage devices that are a hard drive, a random access memory storage device, such as a dynamic random access memory, machine-readable hardware storage devices, and other types of non-transitory machine-readable storage devices, and that are executable on one or more processing devices. All or part of the foregoing may be implemented as an apparatus, method, or electronic system that may include one or more processing devices and memory to store executable instructions to implement the stated functions.

The above aspects can include one or more of the following advantages.

The system described herein is able to process data with improved system performance, such as with a reduced or minimal impact on system computing resources (such as consumption of memory, and/or processing power). Additionally, the system described herein processes this data (e.g., input data, output data, audit data, test data or log data)

with reduced latency and in a scalable manner. In particular, the system is able to output audit data in a recoverable manner without negatively affecting the system performance with regard to output ports. Metrics of the execution of executable logic can be dynamically determined and outputted such that the user can track these metrics in real time. In this context, error states of the system are detected from the metrics and brought to the attention of the user, who is preferably also provided with guidance (e.g., instructions) how to fix the detected errors. Furthermore, the user is preferably enabled to control for which executable logic log records are to be generated to focus the logging on the parts of interest while reducing the generation of excess data amounts. Each of this assists the user in understanding, tracking and properly operating the underlying data processing system in a resource-efficient manner.

The details of one or more embodiments are set forth in the accompanying drawings and the description below. Other features, objects, and advantages of the techniques described herein will be apparent from the description and drawings, and from the claims.

DESCRIPTION

The system described herein provides for a dedicated audit port on a component of a dataflow graph, also called a computation graph or data processing graph. Generally, a dataflow graph is a computer program in form of a graph, expresses a computation and has a first vertex representing a first process of the computation, a second vertex representing a second process of the computation, and a link connecting the first vertex to the second vertex and representing a flow of data between the first process and the second process, where the first vertex and second vertex each has a state associated with it, the link has a communication method associated with it, the connection between the first vertex and the link has a first access method associated with it, and the connection between the second vertex and the link has a second access method associated with it. The vertices of the graph may also be referred to as components. Components generally are executable by containing or referring to a portion of executable logic to be applied to data and have input and output ports, as well as log and error ports and audit ports for the data to be received, processed (by applying the portion of executable logic to the data) and outputted. When a component experiences an error, the data on the log and error ports are lost, as there is no recoverability. In contrast, the data on the audit port is important and is representative of a transaction that has taken place. Meaningful metrics are derived from the audit data, such as, how many transactions have been completed or how many offers has a consumer accepted, etc. As such, the audit port implements recoverability to provide for recoverability of the audit data itself. By having a separate audit port, the audit port is able to output audit data in a recoverable manner without impacting performance of the output port, because the audit port provides for an orthogonal data flow.

Figure 1:
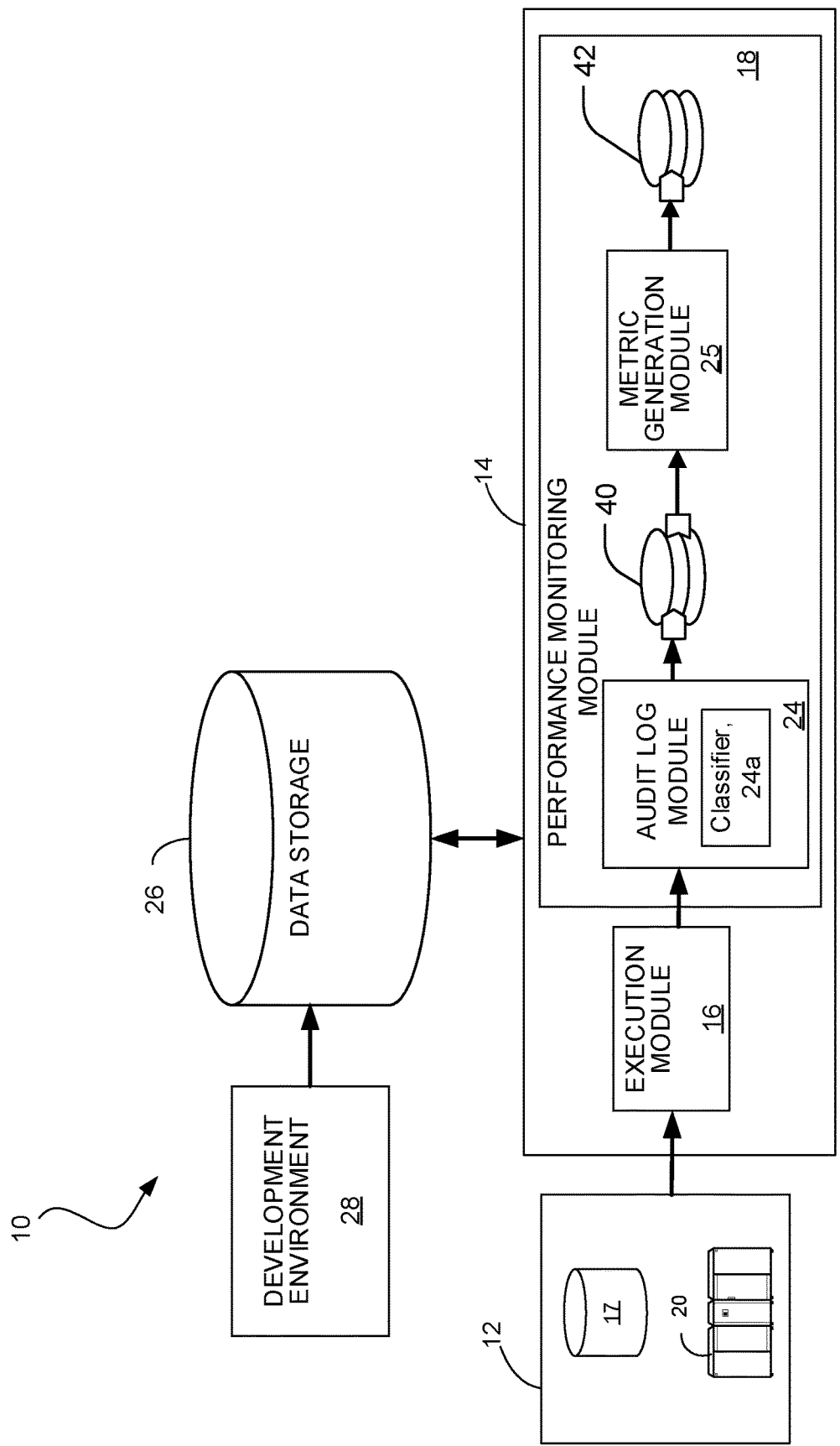
FIGS. 1 and 4A are each a schematic diagram of a database management system.

Referring to FIG. 1, a system 10 for logging includes a data source 12 that may include one or more sources of data such as storage devices or connections to online data streams, each of which may store data in any of a variety of storage formats (e.g., database tables, spreadsheet files, flat text files, or a native format used by a mainframe). An execution environment 14 (e.g., a data processing system) includes an execution module 16 and performance monitoring module 18. The execution environment 14 may be hosted on one or more computers under the control of a suitable operating system, such as the UNIX operating system. For example, the execution environment 14 can include a multiple-node parallel computing environment including a configuration of computer systems using multiple processing units (e.g., central processing units, CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The execution module 16 implements logging (e.g., chart logging, dataflow graph logging, and so forth) that provides details about one or more portions of executable logic that are executed in processing a data record or an item of data and/or a state of and a path taken by data through a computer program (e.g., a chart such as a dataflow graph as described in U.S. Pat. No. 5,966,072, titled "Executing Computations Expressed as Graphs," or as described in U.S. Patent Publication 2016/0342396, the entire contents of each of which are incorporated herein by reference). In this application, the term "a portion of executable logic" may mean a subset of the executable logic, e.g., less than 100% of the executable logic. In some examples, the execution module 16 implements this logging by generating an audit record, including, e.g., a data records with a one or more fields, with each field storing a value representing a characteristic or attribute of processing a particular item of data with a particular portion of executable logic. Hereinafter, audit records may also be referred to as log records or audit data—as described in further detail below. In some example, the execution module 16 implements logging for each unique key (e.g., identifier (ID)) for which data records (herein also called "data item") are processed by the computer program. In some examples, execution module 16 implements data logging for computer programs expressed as graph-based computations, as described in U.S. Pat. Pub. 2009/0327196, the entire contents of which are incorporated herein by reference. In this application, the term "dataflow graph" or "chart" are used as examples of or other word for "computer program". In some examples, the terms "dataflow graph" and "chart" are used herein interchangeably and without distinction, for purposes of convenience. In some examples, the unique key represents a customer ID for each customer for which records are processed by the chart. A user interface displays logging information, such as metrics (e.g., metrics indicative of which portions of a chart are traversed and aggregate metrics indicative of how many times certain portions of a chart are traversed by a group of records). Metrics described throughout this specification may dynamically, e.g., during the executing of the executable logic, be determined. In other words, these metrics are not static but may dynamically change and may be continuously updated in real-time. Metrics described throughout this specification may provide information about computational performance attributes of one or more portions of executable logic that are executed in processing a data item. In this example, the charts (e.g., the dataflow graphs) can be stored in data storage 26 (also referred to herein as memory 26). Storage devices providing the data source 12 may be local to the execution environment 14, for example, being stored on a storage medium connected to a computer running the execution environment 14 (e.g., hard drive 17), or may be remote to the execution environment 14, for example, being hosted on a remote system (e.g., mainframe 20) in communication with a computer running the execution environment 14 over a local or wide area data network.

The execution environment 14 is in communication with data storage 26, which stores data used to display one or more user interfaces. Data storage 26 is also accessible to a development environment 28 (e.g., which may be optional) for developing user interfaces and charts (with logging functionality), stored in data storage 26, that are accessed by execution module 16 (in executing charts) and that are used to display the user interfaces.

In some examples, a chart or dataflow graph is a computer program executed within a dataflow graph execution environment that processes data from one or more data sources. The data from the data sources are manipulated and processed according to the computer program and exported to one or more data sinks. Data sources and sinks can include files, databases, data streams, or queues, for example. Dataflow graphs are represented as directed graphs including nodes representing data processing components each including program code (e.g., executable logic) for processing data from at least one data input and providing data to at least one data output, and nodes representing dataset objects for accessing the data sources and/or sinks. The nodes are connected by directed links representing flows of data between the components, originating at the data sources and terminating at the data sinks. The data output ports of upstream components are connected to the data input ports of downstream components. The dataflow graphs may be reused for different data sources and different data sinks represented by the dataset objects. The data structures and program code used to implement dataflow graphs can support multiple different configurations by being parameterized, for example, to enable different sources and sinks to be substituted readily, for example. Furthermore, in some arrangements, the flow of data in the dataflow graph may be altered by the use of parameters, such that one of the components or a series of the components may be bypassed. In general, a parameter represents a property of a component of the dataflow graph that can be configured with a value and whose value can changed. For example, such property can be changed between uses of the dataflow graph, and the dataflow graph may perform operations differently as a result of the change.

In this example, the dataflow graph includes a graphical layer and a data processing layer. The graphical layer includes the visuals (e.g., the nodes, the data processing components, the ports and arrows or links) in the graphical user interface. A data processing component and the underlying program code (e.g., executable logic) represented by that data processing component may herein collectively be referred to as a "data processing component," for purposes of convenience and without limitation. Similarly, a port (e.g., a visualization of a computer port or an interface) and the underlying program code (e.g., executable logic) represented by that port may herein collectively be referred to as a "port," for purposes of convenience and without limitation. In some examples, a port is an interface to a system, an interface to a software program or executable logic, or a communication path to a system, software program or executable logic. A dataflow graph and the underlying program code (e.g., executable logic) represented by that dataflow graph may herein collectively be referred to as a "dataflow graph," for purposes of convenience and without limitation. A chart and the underlying program code (e.g., executable logic) represented by that chart may herein collectively be referred to as a "chart," for purposes of convenience and without limitation. The executed executable logic is part of the data processing layer, whereas the displayed nodes, components and arrows are part of the graphical layer and encapsulate information about how to execute the executable logic represented by the dataflow graph.

The construction of a dataflow graph can be highly technical in nature in some cases. While written to achieve specific business ends, the underlying structure and construction of the graph is determined based upon technical considerations. For example, graph components may be selected to maximize reusability, or to support parallel processing. Some of the parameters associated with such a parameterized dataflow graph can be used to enable business users to customize dataflow graphs without requiring the user to understand the technical complexities behind its implementation. The parameterized dataflow graphs simplify customization and facilitate reuse.

In other words, the computer system 10 illustrated in FIG. 1 may include: an optional development environment 28 coupled to a data storage 26, wherein the development environment 28 is configured to build a computer program that is associated with a chart or data flow graph that implements a computation performed on data flowing from one or more input data sets through a chart or graph of data processing components to one or more output data sets, wherein the chart or data flow graph is specified by data structures in the data storage 26, the chart or dataflow graph having a plurality of nodes being specified by the data structures and representing the data processing components connected by one or more links, the links being specified by the data structures and representing data flows between the data processing components; an execution environment 14 coupled to the data storage 26 and being hosted on one or more computers, the execution environment 14 including an execution module 16 configured to read the stored data structures specifying the chart or data flow graph and to allocate and configure computing resources for performing the computations of the data processing components that are assigned to the chart or data flow graph by the execution module 16, wherein the execution module 16 is configured to schedule and control execution of the assigned computations of the data processing components such that any one of the methods or processes described herein is executed. The execution module 16 is configured to read data from the data source 12 and to process the data using an executable computer program expressed in form of the chart or dataflow graph.

In this example, an audit record (or also called "log record") includes a data item (e.g., a structured item of data) that specifies a node that is traversed (and/or a data processing component that is executed) in processing a data record or an event and one or more attributes of processing the data record or event. In some examples, a log record is a structured data record with a first field for storing data representing a state of a specification for a particular value of the key. Generally, a specification is a visual representation of executable logic, e.g., that is executed in processing data items. As such, a specification may be or include a chart, a dataflow graph, and so forth. As described in further detail below, the specification is part of the graphical layer. Generally, executable logic includes source code and other computer instructions. The log record may include a second field for storing data specifying which portions of the executable logic represented by the specification have been executed (and/or on which machine—from a plurality of distributed machines—that logic was executed), from a time at which execution of the executable logic is started to at a current time, for that particular value of the key. In general and in this example, upon processing of data records (e.g., for a particular key), the system generates an audit record (or one or more audit records) and stores, in a first field, data representing a state of the specification for the particular value of the key and stores, in a second field, data specifying which portions of the executable logic represented by the specification have been executed, from a time at which execution of the executable logic is started to at a current time, for that particular value of the key. In still other examples, a log record is a structured data record with a field for storing data specifying which portion of the executable logic represented by the specification has been executed at a current time for a particular value of the key. In this example, upon generating the log record, the system populates a field of the log record with data specifying which portion of the executable logic represented by the specification has been executed at a current time for a particular value of the key. In still other examples, the specification is a chart and one or more log records specify a path through the chart that represents which portions of the executable logic are executed in processing one or more data records associated with a particular value of the key. In this example, the system generates log records that specify a path through the chart that represents which portions of the executable logic are executed in processing one or more data records associated with a particular value of the key. In yet other examples, the system generates one or more output records based on processing of one or data items. In this example, each of the one or more output records includes data not included in the log record.

As described in further detail below, various types of audit records are predefined with various fields, each field type specifying one or more attributes of processing the data record or event. Generally, an event includes a data record (e.g., in a predefined format) that represents a particular occurrence or an absence thereof.

In this example, performance monitoring module 18 collects audit records and other performance metrics about the performance of the execution module 16. Performance monitoring module 18 includes audit log module 24 (also referred to herein as an "aggregation engine") that collects audit records from execution module 16, which may in turn be executing multiple, distinct charts that are each producing audit records from each data processing component. Audit log module 24 includes classifier 24a that classifies audit logs, e.g., as described herein. Audit log module 24 aggregates (e.g., at specified time intervals) received audit records by joining contents of the audit records together into a "master" log (e.g., a log record that includes contents of audit records received over a specified period of time). These aggregated log records are stored in data storage 26, e.g., for subsequent accessing, and/or are stored in data store 40 for transmission to metric generation module 25 that generates metrics from the aggregated audit records. Generally, a metric includes detailed data at the aggregate level, including, e.g., some or all of the number of records read, the number of bytes read, the number of records written, the number of bytes written, the processor time used and the elapsed time. Metrics may also specify computational latency through the system for each event (e.g., a data record), and therefore for each event type. Other types of latency metrics that are generated from the aggregated audit records include a latency metric (e.g., a time from when a data record is created at the source to a current time—a "now" time), an external latency metric that specifies a latency from when a data record is created at the source to when the data record was first seen by the system, an internal latency metric that specifies a latency from when the data record was first seen by the system to the now time, and a logical delay metric that specifies a latency from a logical time to the now time. The system may also compute numerous other types of metrics such as execution time for individual processes of a computer program (such as individual components in a dataflow graph), total program or graph execution time, average program or graph execution times for a particular program or graph and so forth. Metric generation module 25 outputs the generated metrics to data store 42.

Performance monitoring module 18 generates output data set (e.g., from data retrieved from one or more of data stores 40, 42) that includes one or more metrics generated from metric generation module 25 and/or includes raw (and/or aggregated data) from collected audit records. In this example, environment 14 (e.g., a data processing system) displays in a user interface one or more portions of the output data set.

Figure 2A:
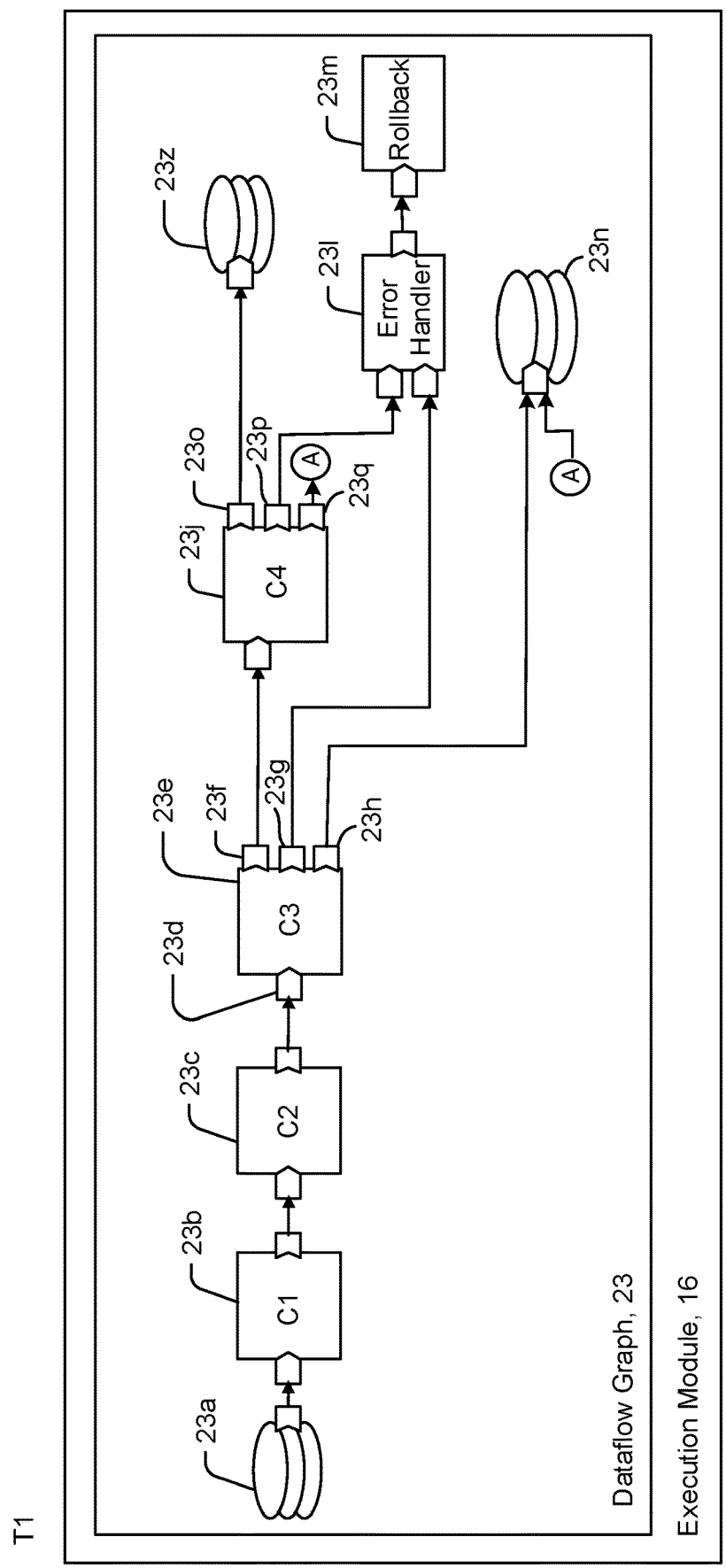
FIGS. 2A-2E illustrate audit ports with recoverability.

Referring to FIG. 2A, execution module 16 stores (or accesses) dataflow graph 23 at a first point in time, T1. In this example, dataflow graph 23 includes data source 23a, components 23b, 23c, 23e, 23j, 23l, 23m and datasinks 23z, 23n.

In this example, dataflow graph 23 is an example of a computation graph that includes a number of vertices (i.e., source 23a, components 23b, 23c, 23e, 23j, 23l, 23m and datasinks 23z, 23n) that are joined by unidirectional links. Computation graph 23 processes a work flow that is made up of a series of work elements such as individual transactions that are processed according to a computation graph associated with a transaction processing system. A transaction may be composed of multiple work elements. Each component is associated with a portion of the computation defined by the overall computation graph. In this example, component 23a provides access to storage for an initial series of work elements associated with one or more transactions, and passes that series on its output link. Processes that implement the computation associated with each of the components process the work elements in turn, and typically produce a work element on one or more of the output links of that vertex.

In this example, component 23e includes input port 23d for receiving input records, output port 23f for outputting output records, error log port 23g for outputting error logs and audit port 23h for outputting audit data. In this example, audit port 23h is configured to output audit data to data sink 23n, e.g., a dedicated data source for collecting audit data. Similarly, component 23j has output port 23o (for outputting output records to data sink 23z), error log port 23p (for outputting error logs to error handler component 23l) and audit port 23q for outputting audit data to data sink 23n.

In this example, dataflow graph 23 includes error handler component 23l that receives an error message, e.g., when an error occurs during processing by a component (e.g., 23r, 23j). Dataflow graph 23 also includes rollback component 23*m*, which reverts or rollbacks the dataflow graph to a state prior to the error. Generally, a rollback allows rewind of the processed data to a point at which a failover, therefore "rewinding" the processed to a previous consistent point. In particular, the input data from component 23*j* tells the error hander component 23*l* what the state of things (e.g., data or components) was before the graph 23 began processing the transaction, and in particular, what the state of the graph 23 was before component 23*e* started execution. The error hander component 23*l* outputs this to the rollback component 23*m*, which uses it to restore any data that was modified by the other components to its state prior to the execution of the transaction, as described in further detail below.

Figure 2B:
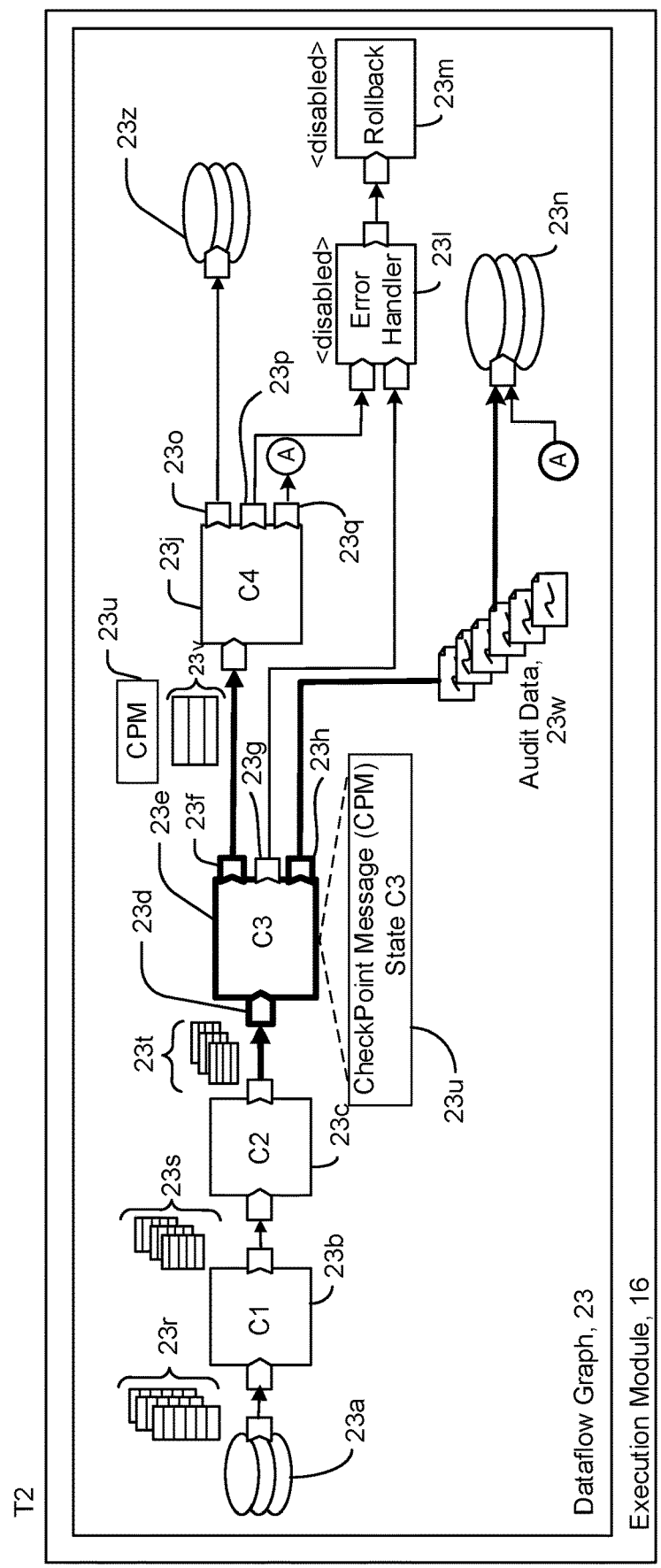

Referring to FIG. 2B, the data processing system executes dataflow graph at a second point in time, T2. In this example, source component 23*a* transmits input records 23*r* to component 23*b*, which processes input records 23*r* and outputs records 23*s*. Records 23*s* are then input into component 23*c*, which processes records 23*s* and—based on the processing—outputs records 23*t*. Component 23*c* transmits records 23*t* to component 23*e* and component 23*e* receives, at input port 23*d*, input records which are records 23*t*. In turn, component 23*e* processes input records 23*t* and outputs, on output port 23*f*, output records 23*v*. Component 23*e* may also implement a checkpointing operation that checkpoints which records (i.e., records 23*t*) are processed by component 23*e*. The checkpointing operation generates checkpoint message 23*u*, which specifies that a current state of dataflow graph 23 is a state in which component 23*e* has successfully executed and has processed records 23*t*. Component 23*e* also outputs, on output port 23*f*, checkpoint message 23*u*. In this example, because component 23*e* successfully processes its input records, nothing is output on error log port 23*g*. Component 23*e* outputs on audit port 23*h* audit data 23*w* describing one or more portions of a transaction represented by input records 23*r*.

Figure 2C:
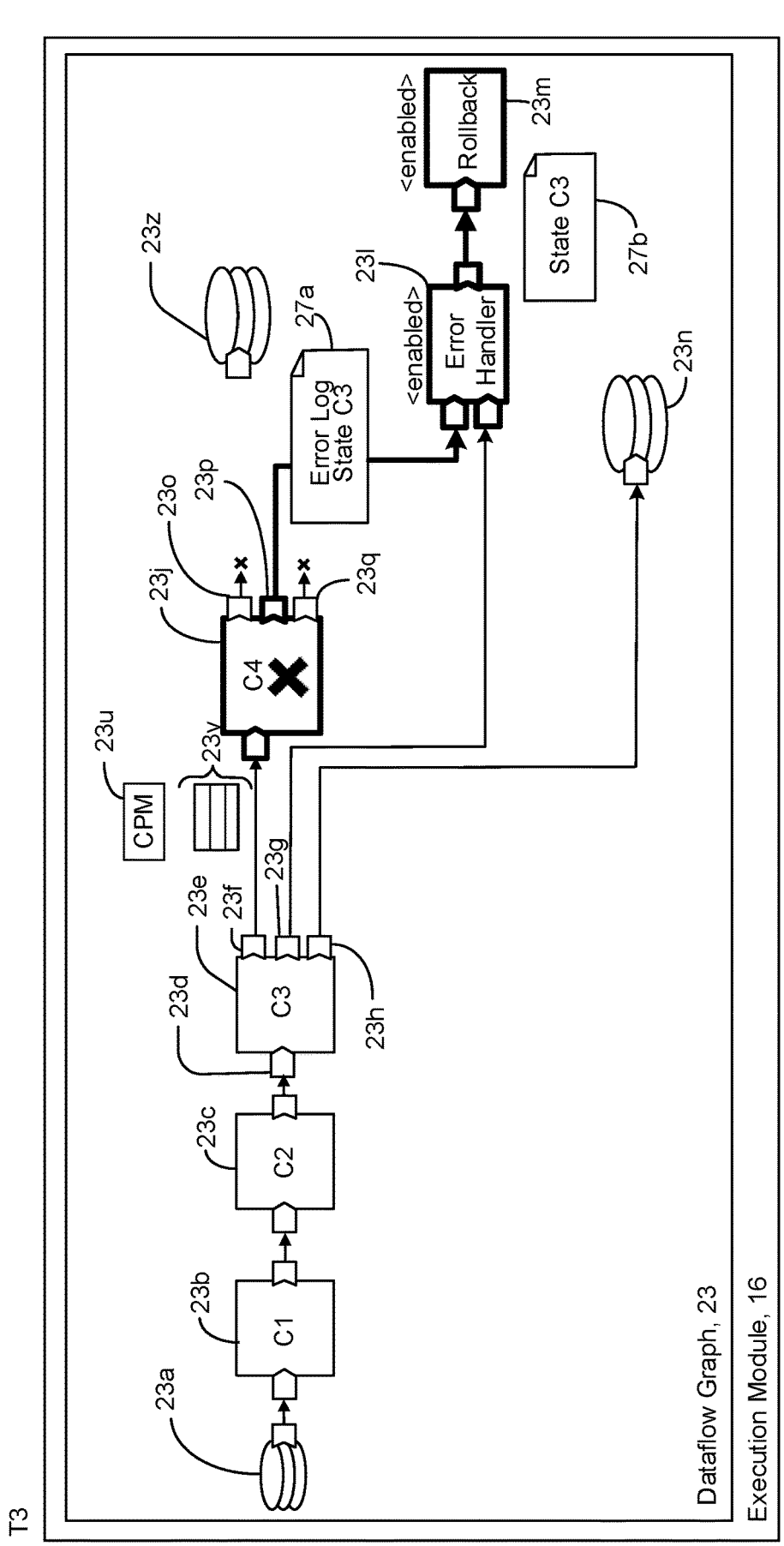
Figure 2D:
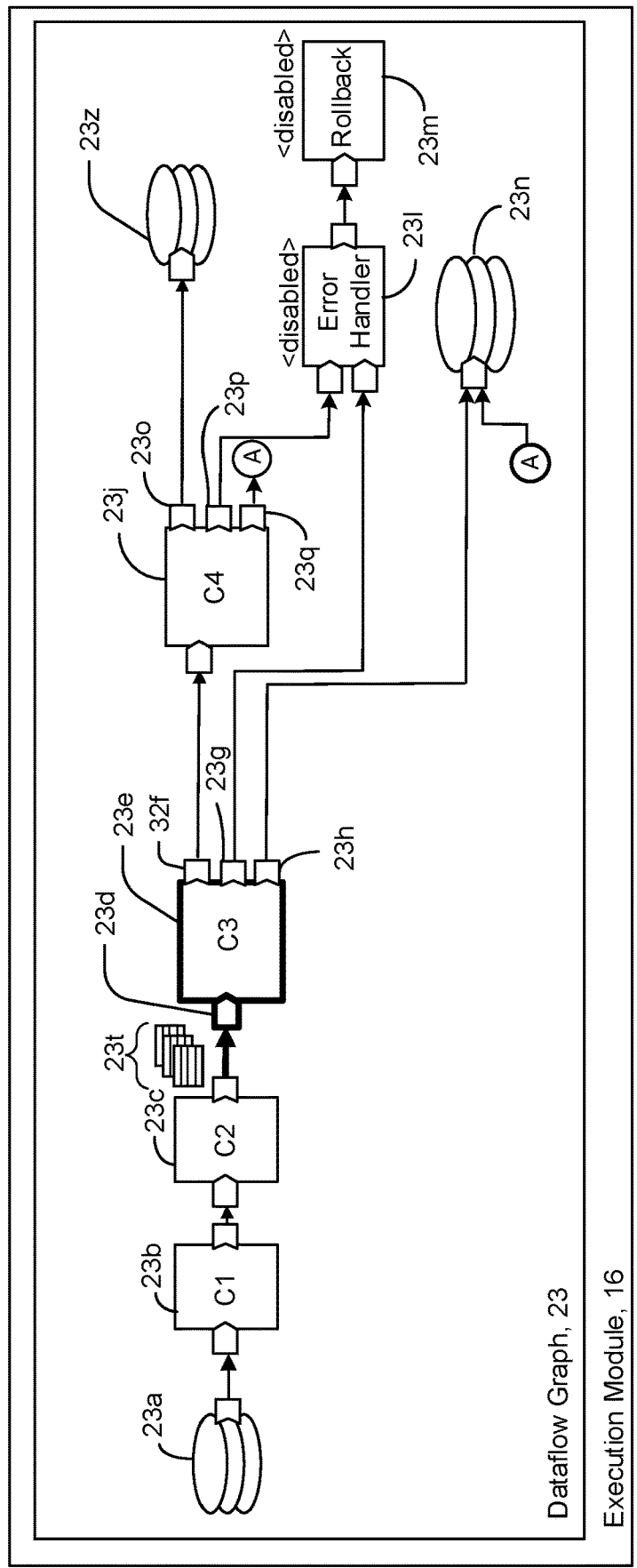

Referring to FIG. 2C, at a third time T3, execution of dataflow graph 23 progress to component 23*j*, which includes output port 23*o*, error log port 23*p*, and audit port 23*q*. In this example, component 23*j* receives records 23*v* and checkpoint message 23*u* as input. Component 23*j* encounters an error in processing input records 23*v*. At this point, the audit data from processing input records 23*v* at component 23*j* is lost—as component 23*j* encountered an error and was not able to complete processing of input records 23*v* and to output audit data from the processing. As such, component 23*j* outputs, on error log port 23*p*, error log 27*a*, which includes the state of the last successfully executed component and also specifies which input records (i.e., records 23*t*) were last successfully processed by that component. At this point, component 23*j* outputs error log 27*a* to error handler component 23*l*, which is now enabled. Error handler component 23*l* transmits to rollback component 23*m* (which is also now enabled) message 27*b* specifying the state (i.e., state C3) of the last successfully executed component, component 23*e*, and which records were processed by that component. Using message 27*b*, rollback component 23*m* returns a state of dataflow graph 23 to a state in which component 23*e* is being executed and in which records 23*t* are being processed, as shown in FIG. 2D, thus enabling recoverability of the audit data for component 23*j*.

Figure 2E:
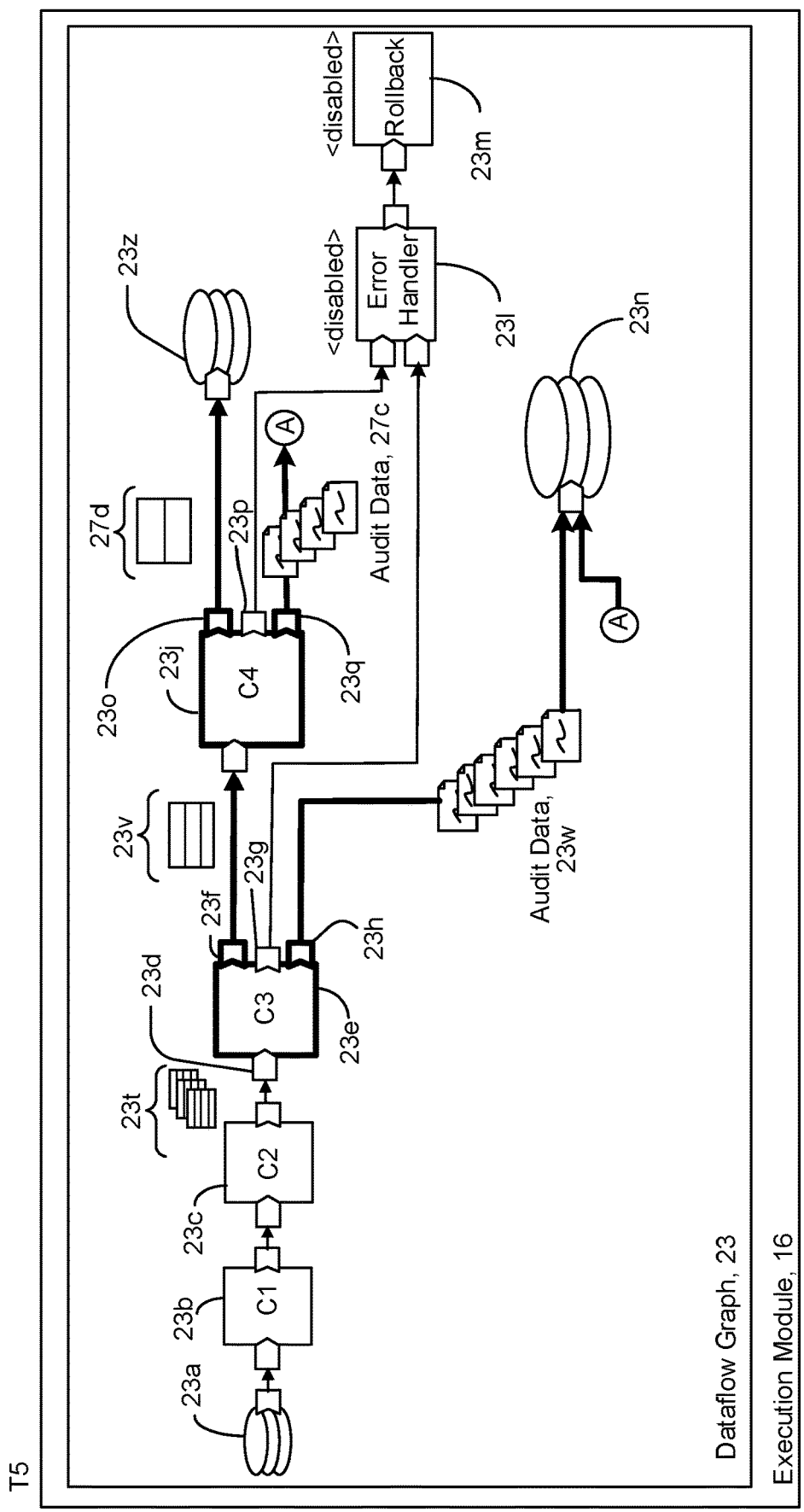

Referring to FIG. 2E, the state of dataflow graph 23 is returned to a state in which component 23*e* executes and processes input records 23*d*. In this example, component 23*j* is able to successfully process input records 23*v* and output, on output port 23*o*, output records 27*d*, which are saved in data sink 23*z*. In this example, no error log is output on error log port 23*p* and audit port 23*q* outputs audit data 27*c*, which is saved in data sink 23*n*. In this example, audit data 27*c* is recovered audit data. Audit data 23*w*, 27*c* collected and saved in data sink 23*n* can be aggregated and joined together, as described herein.

Figure 3A:
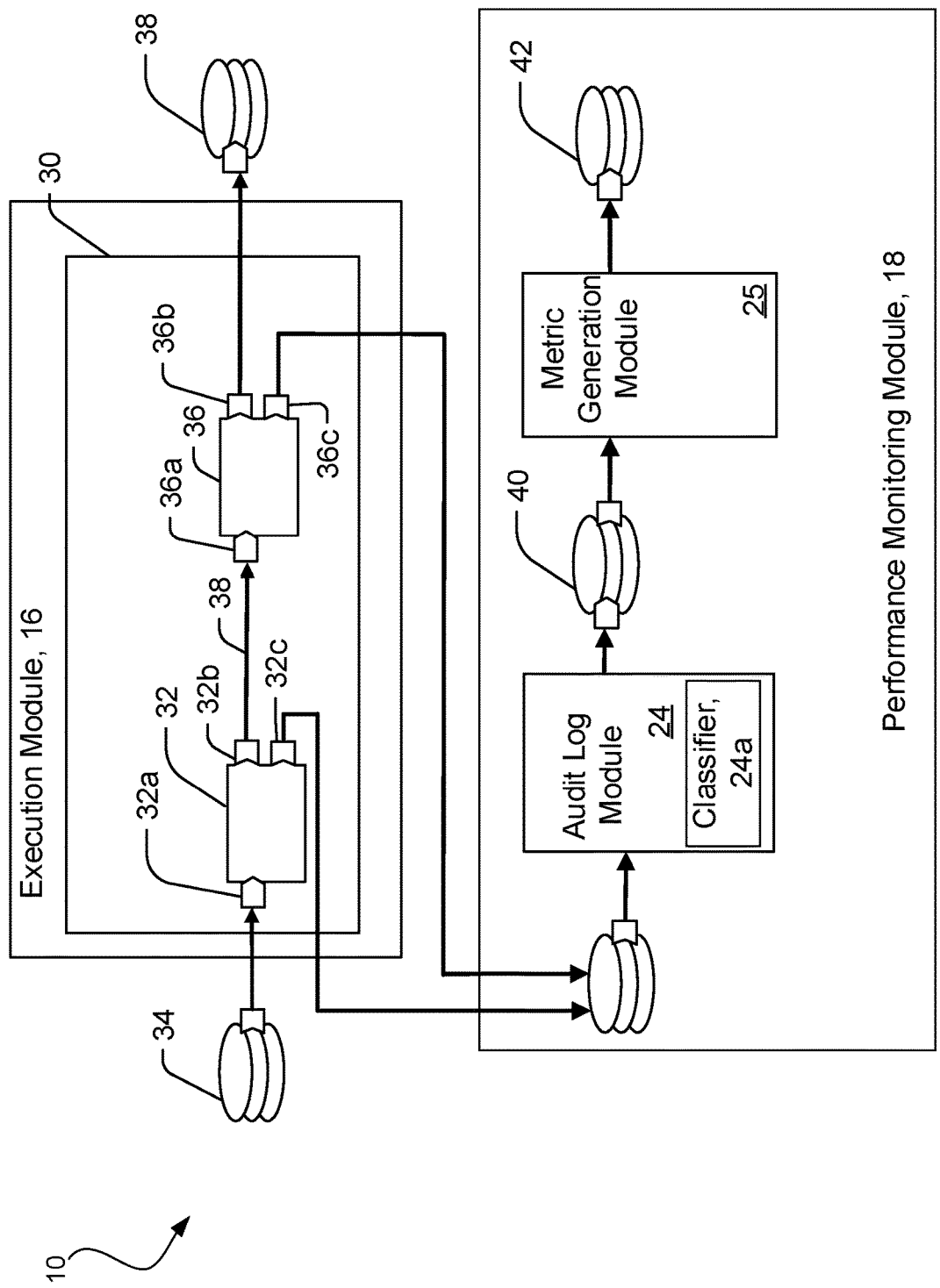
FIGS. 3A, 3B, 4B, 4C, 5A, 5B, 6E and 7 each show an environment for logging the processing of structured data items with executable logic.

Referring to FIG. 3A, environment 10 includes collects audit records (and generates metrics from those collected audit records) from programs, such as graphs, executed by execution module 16.

Execution module 16 executes a computer program such as a graph 30. In some implementations, graph 30 may be precompiled. In this example, an execution module may be, for example, a process or set of processes being executed by a computer system. The graph may be a set of computer readable instructions which can be stored in a non-transitory computer readable storage device, such as the data storage 26 (FIG. 1). The graph 30 may be loaded from a data store, for example, the data storage 26 of FIG. 1.

In this example, graph 30 includes a component 32 that includes input port 32*a*, output port 32*b* and audit port 32*c*. An audit port may also be referred to herein as a "log port" or an "interface." Generally, an audit port is a port for outputting audit records (also referred to herein as "logs" or "log records"). In some example, an audit port includes an interface for outputting audit records or log records and the audit port may be a dedicated port for only outputting audit records. In this example, an audit port is distinct from each of an input port and an output port. In this example, component 32 reads data from a data source 34 and receives that read data through input port 32*a*. In this example, component 32 (or the executable logic represented by component 32) generates one or more audit records and outputs those audit records on port 32*c*. Component 32 is connected to another component 36 by a link 38. Component 36 includes input port 36*a*, output port 36*b* and audit port 36*c*. Data records from output port 32*b* of component 32 are passed into input port 36*a* of component 36. In general, a port refers to any mechanism by which a component of a dataflow graph may receive or provide data. A port may be, for example, a Transmission Control Protocol (TCP)/Internet Protocol (IP) port, a network socket, or a software pipe. A port may also refer to other methods of communication between components such as, for example, reading and writing to shared memory.

Component 36 can produce output records 51*a*-51*b* (FIG. 3B) on output port 36*b* and the output records can be stored in a data store 38. In this example, component 36 monitors and records the performance characteristics of component (32 or 36) and generates an audit record that includes these monitoring and/or performance characteristics. For example, component 36 may collect performance metrics such as any one or combination of processor time used, elapsed time, number of bytes read, number of records read, number of bytes written, number of records written, number of executions, number of failed executions, total duration, average record processing rate (records/second), average byte processing rate (bytes/second), etc. and include these collected metrics in the audit record.

The audit record may be produced (e.g., by component 36 or by the underlying executable logic being represented by component 36) on audit port 36*c* of component 36. For example, the audit records may be one or more records that include information about the performance of component 36 and other, previously described information.

In this example, the audit records output on ports 32*c*, 36*c* are collected by audit log module 24. In this example, audit log module 24 post-processes the audit records—as described in further detail below. Audit log module 24 also joins together and/or rolls-up the data in the collected audit records at specified time intervals (e.g., every hour). Generally, a "join" operation refers to the combining of data from two or more distinct files or data records. Generally, a "rollup" operation refers to aggregating data from one or more files or data records and outputting that aggregated data. For example, a rollup operation could compute a sum, a minimum, a maximum—based on values in fields in one or more data records. In this example, audit log module 24 produces—at the specified time interval—an aggregated audit record (e.g., an audit record generated from performing join and/or rollup operations on individual audit records collected during that particular time interval). Audit log module 24 transmits the aggregated audit record to data store 40 in the performance monitoring module 18. In some implementations, the data store 40 is selected to minimize the performance impact of writing the audit records. For example, it can be advantageous to reduce latency introduced by writing the audit records to the data store 40. In some implementations, the data store 40 may be located in shared memory 40. Shared memory 40 may be a fast memory such as random access memory (RAM). Operations which write to shared (e.g., semi-conductor) memory generally introduce less overhead and are consequently faster than similar operations writing to slower memory, namely a persistent data store, such as a magnetic disk (e.g., hard disk). In this example, audit log module 24 batch stores the collected audit records in data store 40, e.g., by storing—at specified time intervals—the collected audit records, along with the aggregated audit record.

Intermittently, for example, every five minutes, ten minutes, or thirty minutes, metric generation module 25 reads the aggregated audit logs from data store 40 and generates performance metrics from the aggregated audit logs. Metric generation module 25 can read the aggregated audit logs (and/or the individual audit logs, when they are saved) from data store 40 and can further process and aggregate the data. For example, metric generation module 25 may combine—based on data included in the audit logs—the performance metrics associated with multiple programs or dataflow graphs that together make up a single transaction. Performance monitoring module 18 can graphically present or otherwise output the performance metrics to a user by including those metrics in an output data set. Metric generation module 25 writes the performance metrics to a data store 42. In some implementations, data store 42 can be located in a persistent data store. Data store 42 then outputs at least a portion of generated metrics as an output data set. In this example, the components 32 and 36 represent two illustrative examples of two different portions of the executable logic of the computer program.

Figure 3B:
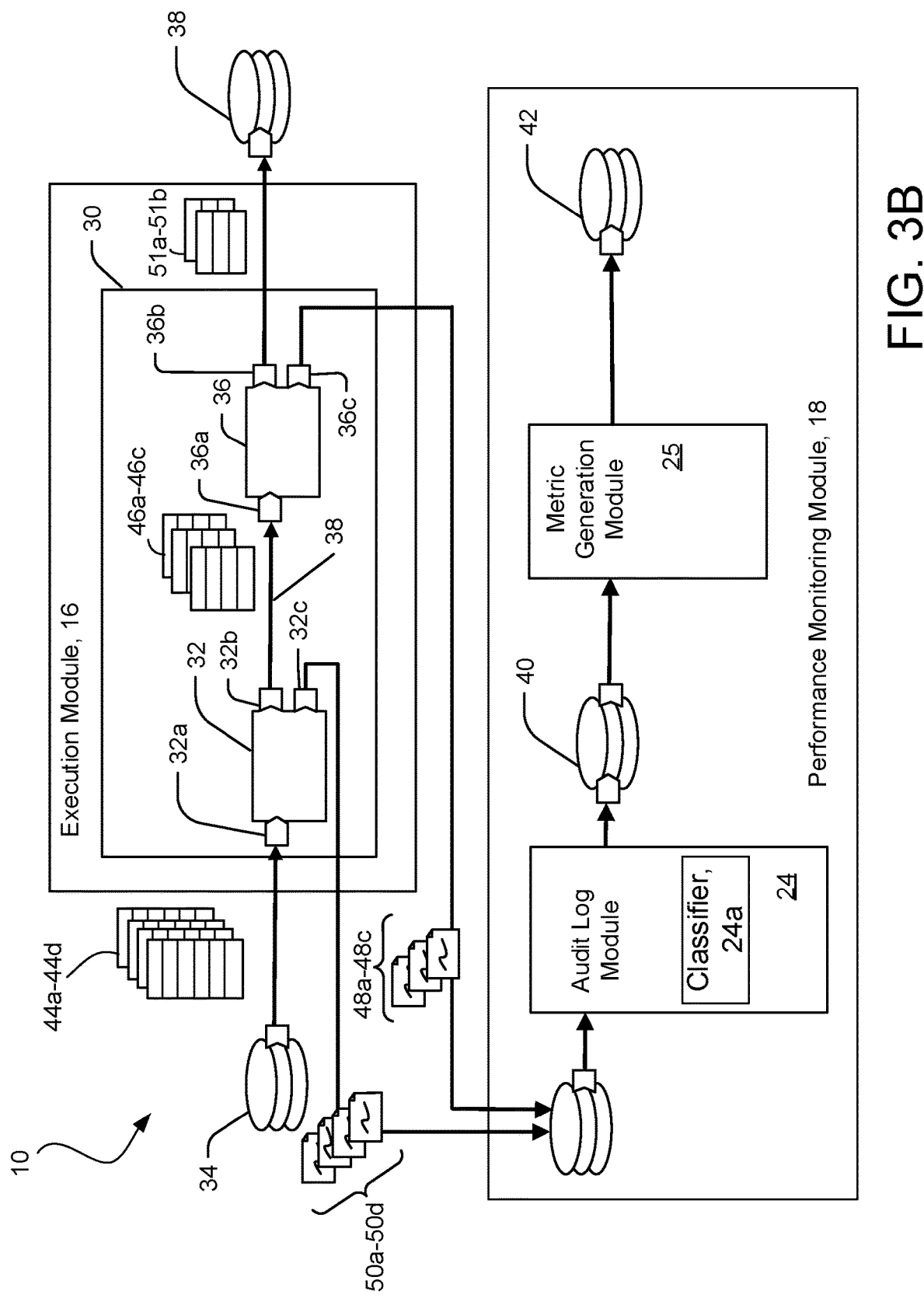

FIG. 3B is a variation of FIG. 3A in which data flow is shown. In this example, component 32 receives (over input port 32a) data records 44a-44d from data source 34. Component processes each of the received data records 44a-44d. In this example, component 32 generates an audit record for each of the processed data records. As such, component 32 generates audit records 50a-50d for data records 44a-44d, respectively. In this example, component 32 outputs each of audit records 50a-50d on port 32c and—via port 32c—transmits audit records 50a-50d to audit log module 24. In this example, port 32c is a dedicated interfere for only generating audit logs and for only sending those audit logs to audit log module 24.

In this example, after processing each of records 44a-44d, component 32 outputs on output port 32b records 46a-46c, which are transmitted to input port 36a of component 36. In this example, the processing of records 44a-44d by component 32 only produces three output records 46a-46c. Component 36 processes records 46a-46c and generates, for each of records 46a-46c, audit records 48a-48c, which are output on output port 36c and transmitted to audit log module 24. In this example, audit log module 24 collects audit records 48a-48c and 50a-50d and performs rollup and/or join operations on these audit records 48a-48c and 50a-50d to produce an aggregated audit record. Audit log module 24 transmits the aggregated audit record to data store 40 (e.g., shared RAM). Metric generation module 25 reads the aggregated audit record and in turn generates metric data (or data record) representing various metrics described herein. Metric generation module 25 transmits metric data to data store 42 for storage and for outputting—at least a part of metric data—to an output data set.

Figure 4A:
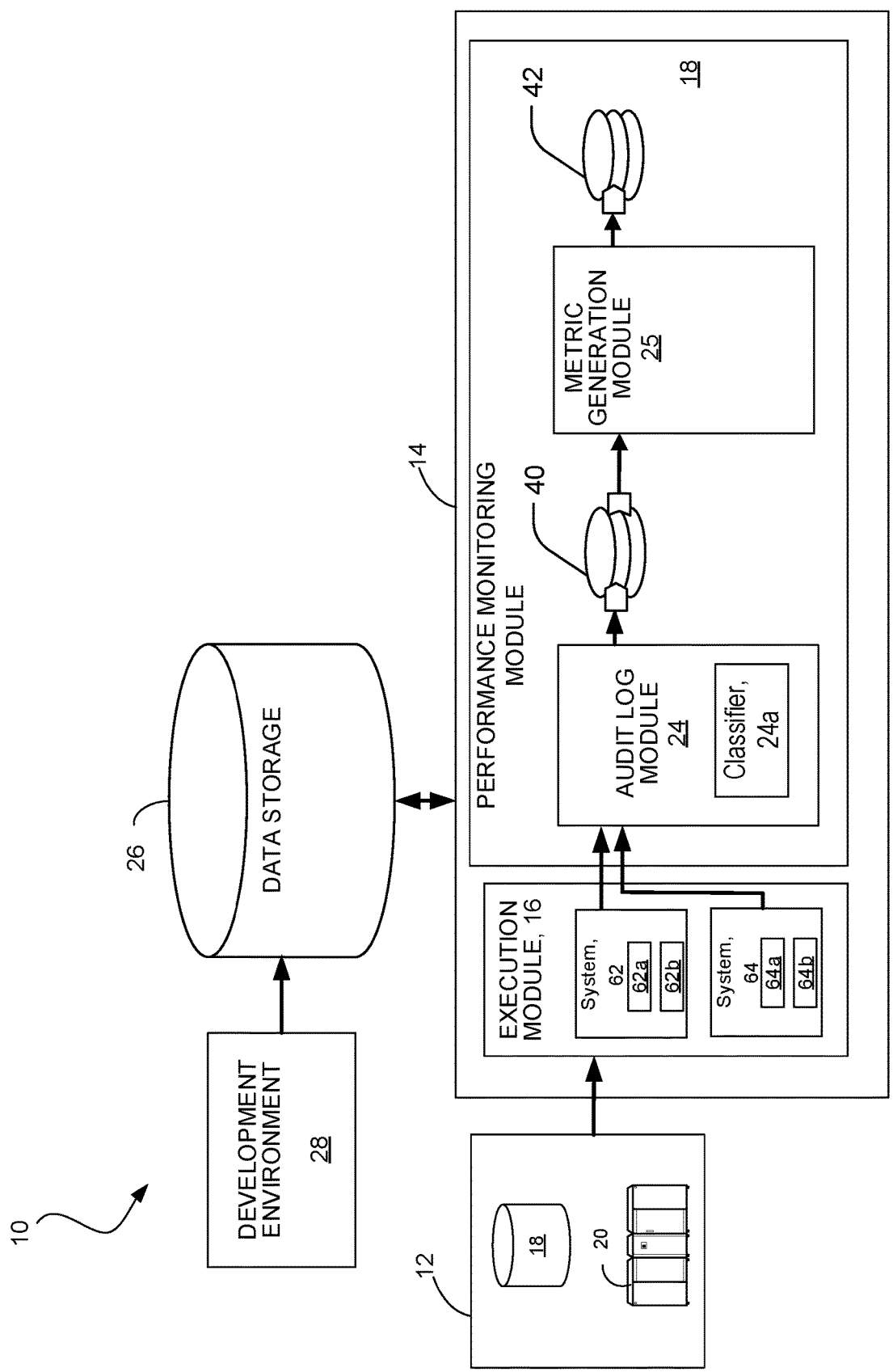

Referring to FIG. 4A, a variation of environment 10 is shown. In this variation, execution module 16 includes two distinct systems, data processing system 62 (also referred to herein as a first processing system 62) and data processing system 64 (also referred to as a second processing system 64). Processing system 62 includes memory 62a and execution sub-system 62b. Processing system 64 includes memory 64a and execution system 64b. Each of processing systems 62, 64 is configured to executing various types of executable logic of a computer program, including, e.g., executable logic representing dataflow graphs, charts, and so forth. In this example, audit log module 24 receives output (e.g., audit or log records) from each of systems 62, 64. Systems 62, 64 are distributed processing systems.

Figure 4B:
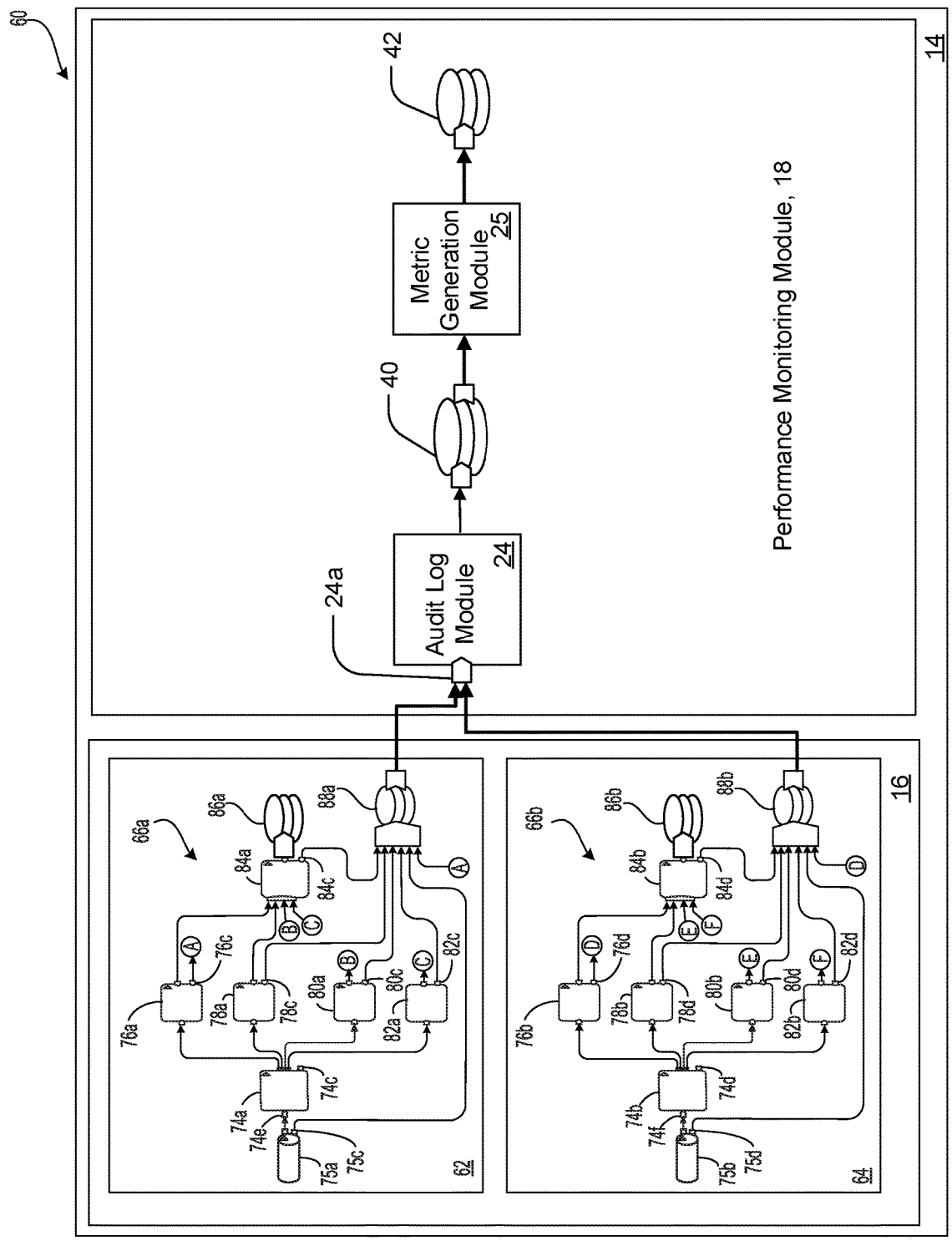

Referring to FIG. 4B, environment 60 includes the data processing systems 62, 64 (included in execution module 16) and the execution environment 14, which also includes the performance monitoring module 18. In this example, data processing system 62 executes executable logic representing dataflow graph 66a (which is a version of particular dataflow graph) with components 74a, 75a, 76a, 78a, 80a, 82a, 84a and data stores 86a, 88a. Hereinafter, execution of a dataflow graph and/or a chart refers to execution of executable logic representing the dataflow graph or chart, respectively. In this example, a component may represent a plurality of data processing entities (e.g., one or more CPUs), connected by one or more links representing data flows between the data processing entities. Data processing system 64 executes executable logic representing dataflow graph 66b, which is another version of the particular dataflow graph executed by data processing system 62. In this example, data processing systems 62, 64 are distributed systems for parallel processing of incoming received data records (e.g., data records received from one or from a plurality of data streams). In a variation, each of data processing systems 62, 64 may executed distinct dataflow graphs.

In this example, each of dataflow graphs 66a, 66b executes a process against data items included in a real-time input data stream. In this example, each of data processing systems 62, 64 executes dataflow graphs 66a, 66b (respectively) in generating a data record (e.g., a wide record of all recorded and/or received events) and publishing that generated record to data stores 86a, 86b (respectively).

Dataflow graph 66a includes subscribe component 75a that subscribes to (e.g., receives data from) a source data reader or a plurality of source data readers. Through subscribe component 75a, dataflow graph 66a accesses, in real-time, items of data included in a real-time data stream. In this example, subscribe component 75*a* receives a real-time input data steam (e.g., including thousands of records) from a data queue (e.g., that may perform some initial processing on the data stream to ensure its readability). Data flows from subscribe component 75*a* to partition component 74*a*, which partitions or divides the data items (which include events) received in the data flows by event types. In this example, partition component 74*a* is configured to detect the different types of data records or events and partitions the various types of events to other components that are configured to process a particular type of event. In this example, each of components 76*a*, 78*a*, 80*a*, 82*a* is configured to process a particular type of event.

In this example, dataflow graph 66*a* includes join component 84*a* that implements a join operation. The join operation combines various types of data, for example, events from components 76*a*, 78*a*, 80*a*, 82*a*. In this example, data flows from components 76*a*, 78*a*, 80*a*, 82*a* to join component 84*a*, which joins the events together in a wide record (e.g., a data record with fields for recording values included in the various processed records). In this example, each of event components 76*a*, 78*a*, 80*a*, 82*a*, sends, to join component 84*a*, an event in association with data that uniquely identifies an entity associated with the event, such as a user ID for the entity. The output of join component 84*a* is a data record with data specifying which particular pre-defined events and user IDs associated with those events. However, in a variation, the output of join component 84*a* could be a data record with contents representative of processing of the received data record through components 76*a*, 78*a*, 80*a*, 82*a*. In this example, data (e.g., a data record) flows from join component 84*a* to data store 86*a*, wherein the data record output from join component is output.

In this example, each of components 74*a*, 75*a*, 76*a*, 78*a*, 80*a*, 82*a*, 84*a* (executing on data processing system 62) has audit ports 74*c*, 75*c*, 76*c*, 78*c*, 80*c*, 82*c*, 84*c* that each output one or more audit records representative of one or more attributes of processing one or more data records through a respective component. For example, audit port 74*c* outputs audit records indicative of performing the partitioning operations on the data records that are received from component 75*a*. Data store 88*a* executing on data processing system 62 receives the audit records output on audit ports 74*c*, 75*c*, 76*c*, 78*c*, 80*c*, 82*c*, 84*c* and transmits (e.g., at specified times, such as every hour) those audit records to audit log module 24 for further processing as described herein. In this example, the components 74*a*, 76*a*, 78*a*, 80*a*, 82*a* and 84*a* represent illustrative examples of different portions of the executable logic of the computer program (here dataflow graph 66*a*).

Dataflow graph 66*b* includes subscribe component 75*b* that subscribes to (e.g., receives data from) a source data reader or a plurality of source data readers. Through subscribe component 75*b*, dataflow graph 66*b* accesses, in real-time, items of data included in a real-time data stream. In this example, subscribe component 75*b* receives a real-time input data steam (e.g., including thousands of records) from a data queue (e.g., that may perform some initial processing on the data stream to ensure its readability). Data flows from subscribe component 75*b* to partition component 74*b*, which partitions or divides the data items (which include events) received in the data flows by event types. In this example, partition component 74*b* is configured to detect the different types of data records or events and partitions the various types of events to other components that are configured to process a particular type of event. In this example, each of components 76*b*, 78*b*, 80*b*, 82*b* is configured to process a particular type of event (e.g., record).

In this example, dataflow graph 66*b* includes join component 84*b* that implements a join operation. The join operation combines various types of data, for example, events from components 76*b*, 78*b*, 80*b*, 82*b*. In this example, data flows from components 76*b*, 78*b*, 80*b*, 82*b* to join component 84*b*, which joins the events together in a wide record (e.g., a data record with fields for recording values included in the various processed records). In this example, each of event components 76*b*, 78*b*, 80*b*, 82*b*, sends, to join component 84*b*, an event in association with data that uniquely identifies an entity associated with the event, such as a user ID for the entity. The output of join component 84*b* is a data record with data specifying which particular pre-defined events and user IDs associated with those events. However, in a variation, the output of join component 84*b* could be a data record with contents representative of processing of the received data record through components 76*b*, 78*b*, 80*b*, 82*b*. In this example, data (e.g., a data record) flows from join component 84*b* to data store 86*b*, wherein the data record output from join component is output.

In this example, each of components 74*b*, 75*b*, 76*b*, 78*b*, 80*b*, 82*b*, 84*b* (executing on data processing system 64) has audit ports 74*d*, 75*d*, 76*d*, 78*d*, 80*d*, 82*d*, 84*d* that each output one or more audit records representative of one or more attributes of processing one or more data records through a respective component. For example, audit port 74*d* outputs audit records indicative of performing the partitioning operations on the data records that are received from component 75*b*. Data store 88*b* executing on data processing system 64 receives the audit records output on audit ports 74*d*, 75*d*, 76*d*, 78*d*, 80*d*, 82*d*, 84*d* and transmits (e.g., at specified times, such as every hour) those audit records to audit log module 24 for further processing as described herein. In this example, the components 74*b*, 76*b*, 78*b*, 80*b*, 82*b* and 84*b* represent illustrative examples of different portions of the executable logic of the computer program (here dataflow graph 66*b*).

In this example, audit log module 24 receives audit records from distributed systems, e.g., data processing systems 62, 64, where each of those distributed systems is—in turn—partitioning the processing of data records received from components 75*a*, 75*b*-respectively. In effect, audit log module 24 is receiving audit records from data flow graphs that are partitioning data records and that are being executed across many different systems in a distributed manner. In this example, each of components 74*a-b*, 75*a-b*, 76*a-b*, 78*a-b*, 80*a-b*, 82*a-b*, 84*a-b* have an audit port. In some variations, only a subset of the components included in a dataflow graph may have audit ports.

In this example, each of distributed data processing systems 62, 64 are distinct from each of execution environment 14 and environment 10 (FIG. 1). From each data processing systems 62, 64, audit log module 24 receives one or more log records from that distributed data processing system joins contents of log records received from each of the distributed data processing systems 62, 64. In this example, each of data processing systems 62, 64 intermittently receives, over an input device or port (e.g., components 75*a*, 75*b*, respectively), one or more data items of a stream of data. For at least one of the one or more data items received, each of data processing systems 62, 64 processes a data item including executing, on that data item, a first portion of executable logic representing graphs 66a, 66b, respectively. For example, the first portion may include executable logic representing a partition component, e.g., one of components 74a, 74b. In this example, each of systems 62, 64 accesses (e.g., from data storage 26 in FIG. 1) a specification for dataflow graphs 66a, 66b, which in turn represent executable logic, In response to this execution, each of systems 62, 64 generates a first log record, with the first log record specifying the first portion of the executable logic that is executed in processing that data item on that distributed data processing system, and outputting, by an interface (e.g., audit ports 74c, 74d, respectively) the first log record to the audit log module 24, e.g., by first transmitting the first log record to data store 88a (e.g., a shared RAM), which in turn transmits (e.g., in real time, at specified times and/or in batch) the first log record or log records to audit log module 24. The log records include values of attributes of processing of a data record or event by a particular component. There are various types of attributes, including, e.g., a latency attribute (specifying an amount of elapsed time from when a component starts processing a data record until when the component completes processing of the data record(s)), a key attribute (specifying a key included in a processed data record), a contents attribute (specifying contents of the data record being processed by the component), a start time attribute (specifying a time at which the component starts processing) and so forth. In this example, audit log module 24 joins together the contents of received audit logs and stores them in memory (e.g., data store 40). The memory may be a RAM or a hard disk. Metric generation module 25 then accesses from the memory the joined contents and generates, from the joined contents, one or more metrics.

In the example of FIG. 4B, each component in dataflow graphs 66a, 66b includes an audit port to enable more accurate and more granular audit logging. Additionally, audit log module 24 collects audit records from multiple systems 62, 64, with the records processed by each of systems 62, 64 being partitioned in the processing, e.g., via partition components 74a, 74b. As such, audit log module is able to collect audit records from multiple partitioned systems. The benefit of doing so—rather than each of systems 62, 64 individually collecting its own audit records—is that audit log module 24 is able to detect multi-system errors (e.g., errors occurring across both systems 62, 64) and errors within the execution module itself. Already providing the means for detection of such errors, and then ultimately also the correction of these detected errors, provides means that improve system performance and decrease latency. In an example, a particular component, e.g., represented by components 78a, 78b in graphs 66a, 66b, is a component to re-format data. In this example, the particular component cannot properly perform the re-format only for certain incoming data types. When data flow graph is run across multiple systems (e.g., one-hundred systems), the particular component is executing on one hundred distinct systems. Because audit log module 24 is collecting (via a dedicated output port on component 78a) audit records for component 78a, 78b as component 78a, 78b is being executed across multiple, such as those one-hundred, systems (with each of the one-hundred systems processing a different type of data or a different data format), audit log module 24 is able to identify certain data type or formats for which the particular component is unable to correctly perform the re-format. By collecting all the audit records centrally in audit log module 24, audit log module 24 can identify collective error data—the various different types of data types or formats for which component 78a, 78b is unable to re-format. As such this collective error data may be used by the execution environment 14 to correct the problem—system wide—for the particular component (e.g., by editing the executable logic stored in a central library or repository for component 78a, 78b), rather than individual fixes on each particular machine, which would ultimately be more time consuming and may not even solve the problem for new data types. Thus, the computing performance of the underlying data processing system is improved.

Additionally, because audit log module 24 is centrally collecting audit records across all or multiple machines, execution environment 14 (e.g., a data processing system) generates real-time audit records and metrics at scale (e.g., generating and processing audit records for billions of events per day). This is because each system (e.g., systems 62, 64) executing the computer program, such as a chart or dataflow graph 66a, 66b, automatically pushes—in real-time, i.e. while the program/chart/dataflow graph is currently executing—audit records towards audit log module 24 such that the audit records become accessible to the audit log module 24 already during execution of the program/chart/dataflow graph and before completion of this execution, rather than storing the audit records only locally on the system and then at specified times pushing the records to audit log module. The audit records may either be directly pushed to the log module 24 without any local storing of the audit records on the corresponding system 62, 64, or may be stored locally in the data store 88a, 88b, which are accessible to the log module 24 already during execution of the program/chart/dataflow graph. The data stores 88a, 88b may be shared memory (e.g. RAM), which would still be beneficial for reducing latency even if the records are stored locally. Additionally, each component has a dedicated audit port, which further allows the audit log module to receive the audit record in real time with regard to when that component processes a data record or event. This reduces a latency in receiving audit records. For example, if an audit record is only generated upon completion of a chart or a dataflow graph, latency is introduced by waiting for the system to complete execution of chart or dataflow graph, which in turn increases latency in correcting an error (represented in an audit record) and/or in generating metrics. By each component having a dedicated audit port and automatically pushing audit records (e.g., directly without locally storing the records or via the shared memory) to the audit log module as soon as that component finishes execution (e.g., as soon as the executable logic represented by that component finishes execution), a latency in receiving audit records—and computing metrics from those audit records—is reduced, relative to a latency in receiving audit records only upon completion of the chart.

Moreover, the distributed nature of the graphs (running on multiple machines) and with each graph partitioning the processing of the records provides for the audit records being received by the audit log module in real-time and/or in near real-time (e.g, live time) with respect to when an event or data record is processed by each component in the graph, which in turn provides for generation of real-time metrics and thereby for real-time identification of errors based on the metrics. Execution environment 14 is able to process the audit records at scale because the audit records are being generated in parallel across multiple systems (as each component processes a data record or event), which in turn are each partitioning received records to process them. That is, as more and more data records are being received or as more queues are being subscribed to (and thus more data records are received through those queries, execution environment 14 is able to process these data records at scale, e.g., by adding more systems (executing the appropriate graphs and/or charts, with each component of the graph and/or chart including a dedicated audit port) to process the increase in data records and to do the processing at scale, which in turn allows generation of the audit records at scale and in real-time, as each component executes. Execution environment 14 is able to process these records at scale because the generation of the audit records (and the resultant flow from generation of the audit records) is separate from the dataflow of processing the stream of data. That is, by having a dedicated port for generation of audit record, the generation of audit records is orthogonal to dataflow (resultant from data processing) and as such the generation of audit record does not impact the dataflow. That is, a data processing system includes multiple processing systems (or sub-systems) that each include dedicated log ports to enable output of log data in a data stream that is distinct from a data stream including data items being processed by the multiple sub-systems of the data processing system—thereby the output of the log data does not introduce latency into the processing of the data. In particular, the outputs (e.g., the audit records) can be considered asynchronous to the dataflow. The data processing through the data flow graph is a first layer of data processing. The audit ports are a second layer. As such, the performance of the second layer does not impact the first layer. By generating the audit records in this second (asynchronous) layer, the generation of the records is not impacted. This allows audit records—and metrics (which are generated from the audit records)—to be generated at scale.

Additionally, execution environment 14 is able to generate the metrics at scale because the system is able to process data records at scale (e.g., through the implementation of additional systems running appropriate dataflow graphs and/ or charts), as described above. Additionally, the metrics are being generated in real-time or in near-real time (as each component across all the executing systems finishes execution) because the metrics are being generated in response to and as the audit records are being received and processed, which is in real-time or near real-time.

By centrally collecting all the metrics (e.g., by centrally collecting all the audit records and the generating the metrics from the centrally collected audit records), execution environment 14 is able to generate and display more accurate, granular and aggregate metrics—in real-time. For example, the processing speed of an individual component, e.g., component 78a can be computed in near-real time as that component is executing. For example, if component 78a is executing across one-hundred different machines, and each audit record produced for component 78a (via a dedicated port for component 78a) includes a latency metrics specifying when component 78a started processing a data record and when component 78a completed processing the data records, then metric generation module can compute in near-real time (relative to when component 78a executes (or the executable logic representing component 78a execution)) an average latency (e.g., processing time) from when component 78a starts processing a data record to when component 78a complete processsing the data records. By being able to compute metrics at a component level (as opposed to at a graph level), the metric generation module enables identification of errors and latency issues at a component level—that may be masked or not readily apparent from metrics at a graph level. The receipt of audit records for each component (via the dedicated audit port) enables the metric generation module to generate these component specific metrics. For example, if audit records were only being generated at a graph-wide level, then a latency metric would only be indicative of a latency of a graph overall. In this example, graphs with latency metrics of less than five milliseconds are considered acceptable. In this example, an average latency time of a graph executing component 78a is four milliseconds. As such, the system determines that the graph has acceptable performance. However, when metric generation module computes the average latency time of component 78a itself, that latency time is fifteen milliseconds. Metric generation module is able to compute this average latency time (based on execution of component 78a across multiple, different systems), because each of component 78a executing on each of the systems has a dedicated audit port that generates an audit record—in near real-time relative to execution of component 78a—and those audit records are collected by audit log module, which in turn are processed by metric generation module to generate real-time granular metrics. Due to the ability of the metric generation module to generate real-time metrics—at an aggregate level—for individual components, the system can identify latency or performance issues of individual components and address or otherwise remedy those latency issues (e.g., through modification of the executable logic representing that component) thus reducing the latency of graph execution, relative to a latency of graph execution without identification of individual component performance issue, and improving the performance of the system overall.

In this example, processing system 62 includes data store 88a for storing log data output. In this example, processing system 62 includes memory 62a (FIG. 4A) storing executable logic (e.g., executable logic for a dataflow graph or chart) for processing data items. A first portion (e.g., represented by component 82a) of the executable logic (represented by dataflow graph 66a) includes a first dedicated output port (e.g., output port 82c) for outputting log data to the data store 88a, with the first dedicated output port outputting log data indicative of processing of a data item through the first portion of the executable logic. In this example, a second portion (e.g., represented by component 80a) of the executable logic includes a second dedicated output port (e.g., output port 80c) for outputting log data to the data store 88a, with the second dedicated output port outputting the log data indicative of processing of a data item through the second portion of the executable logic. In this example, system 62 includes an execution system 62b (FIG. 4A) that: for a first one of the data items received, processes that first data item with the first portion of executable logic. In this example, a second processing system (e.g., system 64) for processing data items is included in environment 14. The second processing system includes a data store 88b and memory (e.g., 64a in FIG. 4A) storing executable logic (represented by dataflow graph 66b) for processing data items. An execution system (e.g., execution system 64b in FIG. 4A) within the second processing system is configured to execute the executable logic and to produce log data that is stored in the data store. A monitoring system (e.g., performance monitoring module 18) includes an input port (e.g., input port 24a on audit log module 24) for obtaining, retrieving or receiving, from the data store 88a of the first processing system 62, the stored log data and for obtaining, retrieving or receiving, from the data store 88b of the second processing system 64, the log data from the second processing system.

For each of the first and second processing systems 62, 64, the respective execution system (e.g., 62b, 64b in FIG. 4A, respectively) or the executable logic partitions a plurality of received data items such that two or more of the data items are assigned to a partition component (e.g., component 74*a* or 74*b*) of the executable logic, with each partition component including an output port (e.g., 74*c*, 74*d*) and an input port (e.g., 74*e*, 74*f*, respectively), and with the execution system performing operations including: for each partition component and for each data item received at an input port of the partition component, processing that data item assigned to that partition component; and outputting, on the output port of the partition component, log data specifying processing of that data item by the partition component; wherein the data store, for that processing system, receives log data output from output ports of partition components for that processing system. In this example, the monitoring system 18 receives log data output from respective data stores 88*a*, 88*b* of the first and second processing systems 62, 64, with the received log data being output from respective output ports 74*c*, 74*d* of respective partition components 74*a*, 74*b* of the first and second processing systems 62, 64.

Figure 4C:
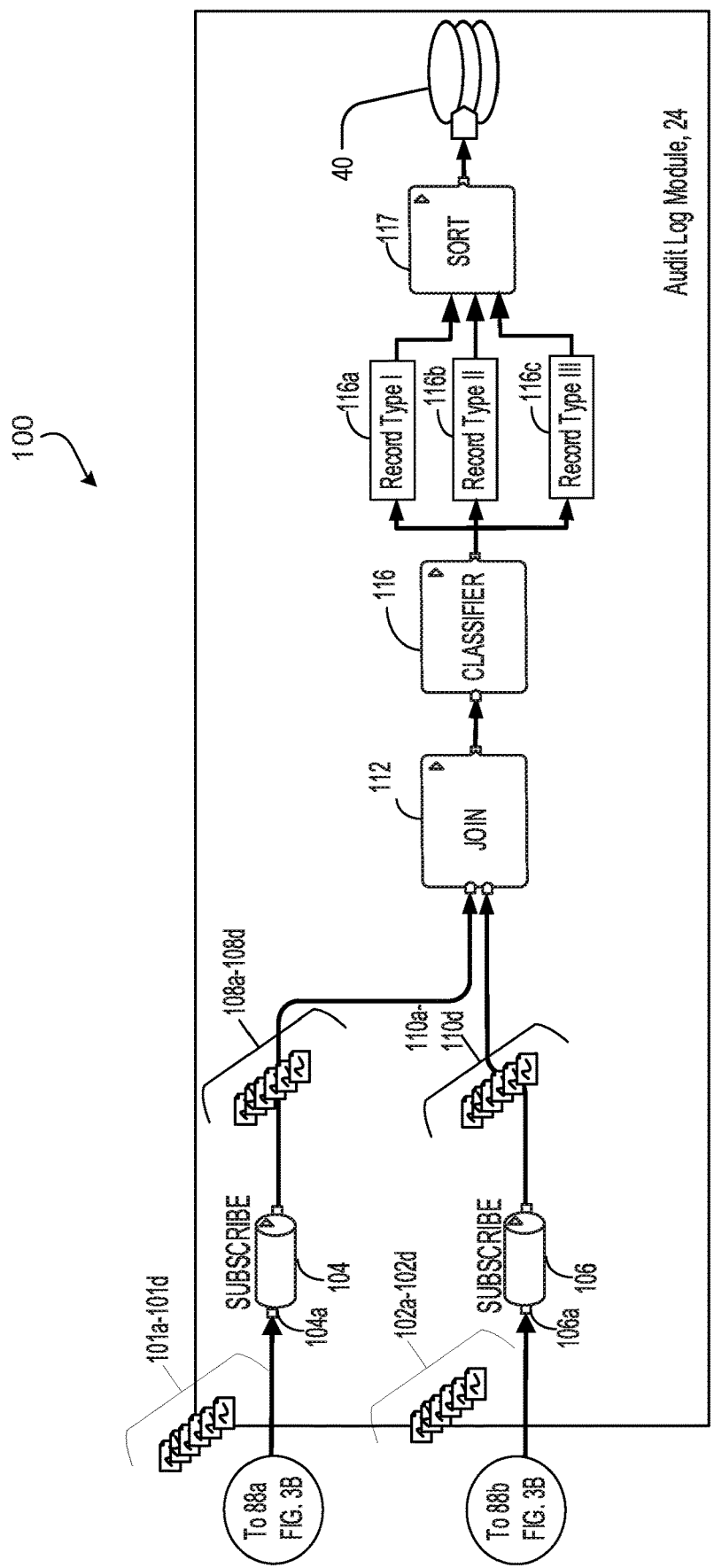

Referring to FIG. 4C, environment 100 shows components included in audit log module 24. In this example, audit log module 24 includes subscribe component 104 that subscribes to (e.g., obtains, retrieves or receives data from) a source data reader, a plurality of source data readers, and/or a database (e.g., data store 88*a* in FIG. 4B). Subscribe component 104 includes port 104*a* for receiving audit log records. Audit log module 24 also includes subscribe component 106 that subscribes to (e.g., receives data from) a source data reader, a plurality of source data readers, and/or a database (e.g., data store 88*b* in FIG. 4B). Subscribe component 106 includes port 106*a* for receiving audit records. In this example, audit log module 24 also includes join component 112, and classifier component 116.

In this example, subscribe component 104, accesses (from data store 88*a* in FIG. 4B)—in real-time—audit records 101*a*-101*d*. Subscribe component 104 may perform some formatting of audit records 101*a*-101*d* (e.g., such as to ensure that all field values are in a specified format) or may add some enhancement data (e.g., by accessing another data store—not shown—add retrieving data for a particular subscriber specified in an audit record and adding that retrieved data to an audit record as an enhancement). Subscribe component 104 outputs audit records 108*a*-108*d* to join component 112. Audit records 108*a*-108*d* may be the same as audit records 101*a*-101*d* or may be different, e.g., when one or more of audit records 101*a*-101*d* are reformatted and/or enhanced.

In this example, subscribe component 106, accesses (from data store 88*b* in FIG. 4B)—in real-time—audit records 102*a*-102*d*. Subscribe component 106 may perform some formatting of audit records 102*a*-102*d* (e.g., such as to ensure that all field values are in a specified format) or may add some enhancement data (e.g., by accessing another data store—not shown—add retrieving data for a particular subscriber specified in an audit record and adding that retrieved data to an audit record as an enhancement). Subscribe component 106 outputs audit records 110*a*-110*d* to join component 112. Audit records 110*a*-110*d* may be the same as audit records 102*a*-102*d* or may be different, e.g., when one or more of audit records 102*a*-102*d* are reformatted and/or enhanced.

Join component 112 joins together audit records 108*a*-108*d* with audit records 110*a*-110*d*, e.g., at specified time intervals—such as hourly. In some examples, audit records 108*a*-108*d* are joined with audit records 110*a*-110*d* by merging the contents and producing joined audit record 114. In other examples, audit records 108*a*-108*d* are joined with audit records 110*a*-110*d* by keys. For example, if one or more of audit records includes a value of a particular key and fields associated with that key, then audit records (or fields included in audit records) for that value of the particular key are joined together to produce an audit record for that key. Join component 112 outputs joined audit records to classifier component 116, which classifies the audit records, e.g., by audit record type as determined by keys. In this example, classifier 116 identifies three different record types 116*a*-116*c*, which are then sorted (e.g., time sorted) by sort component 117. The sorted, classified audit records are output to data store 40 and stored in data store 40 (e.g., RAM).

Figure 5A:
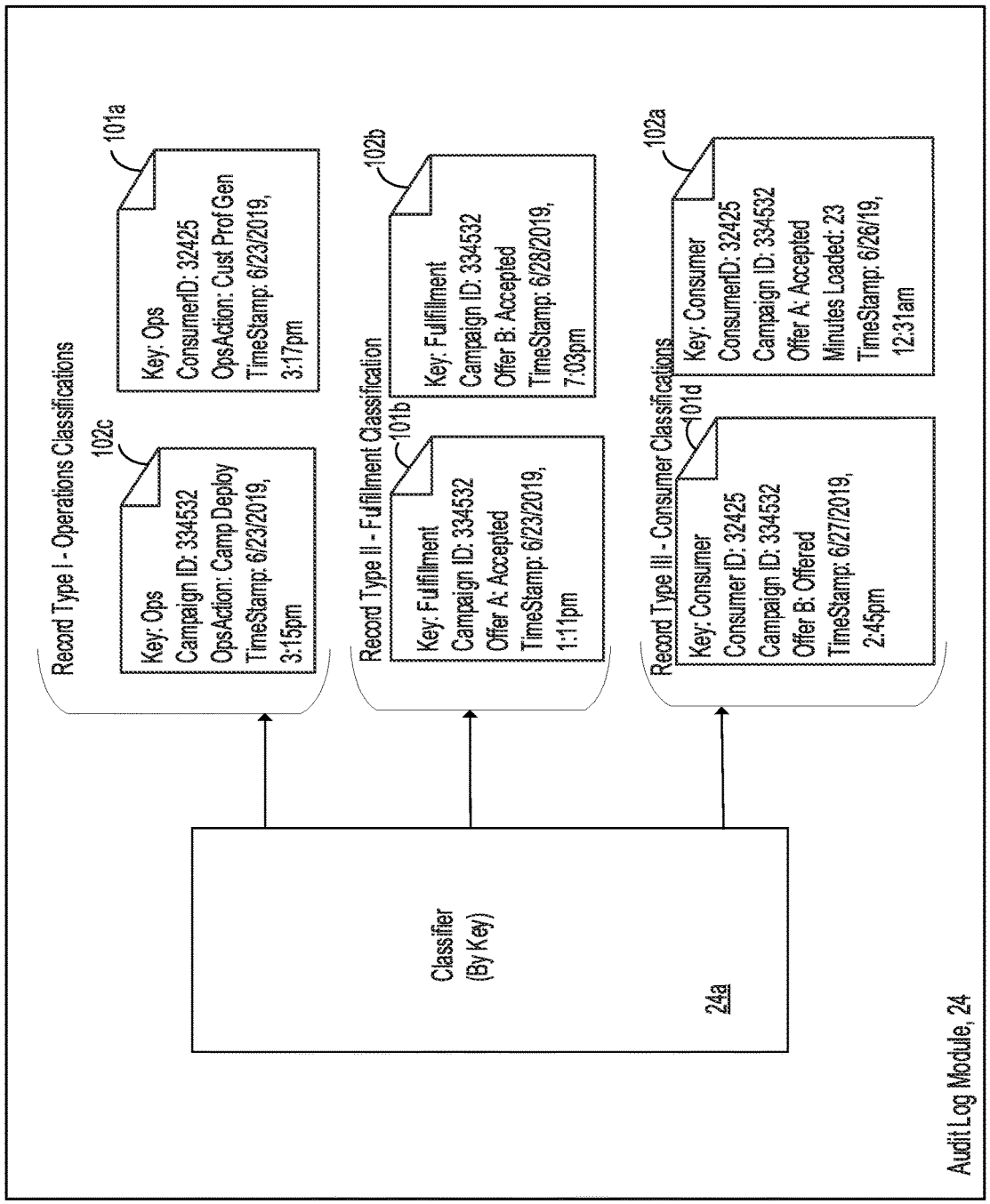
Figure 5B:
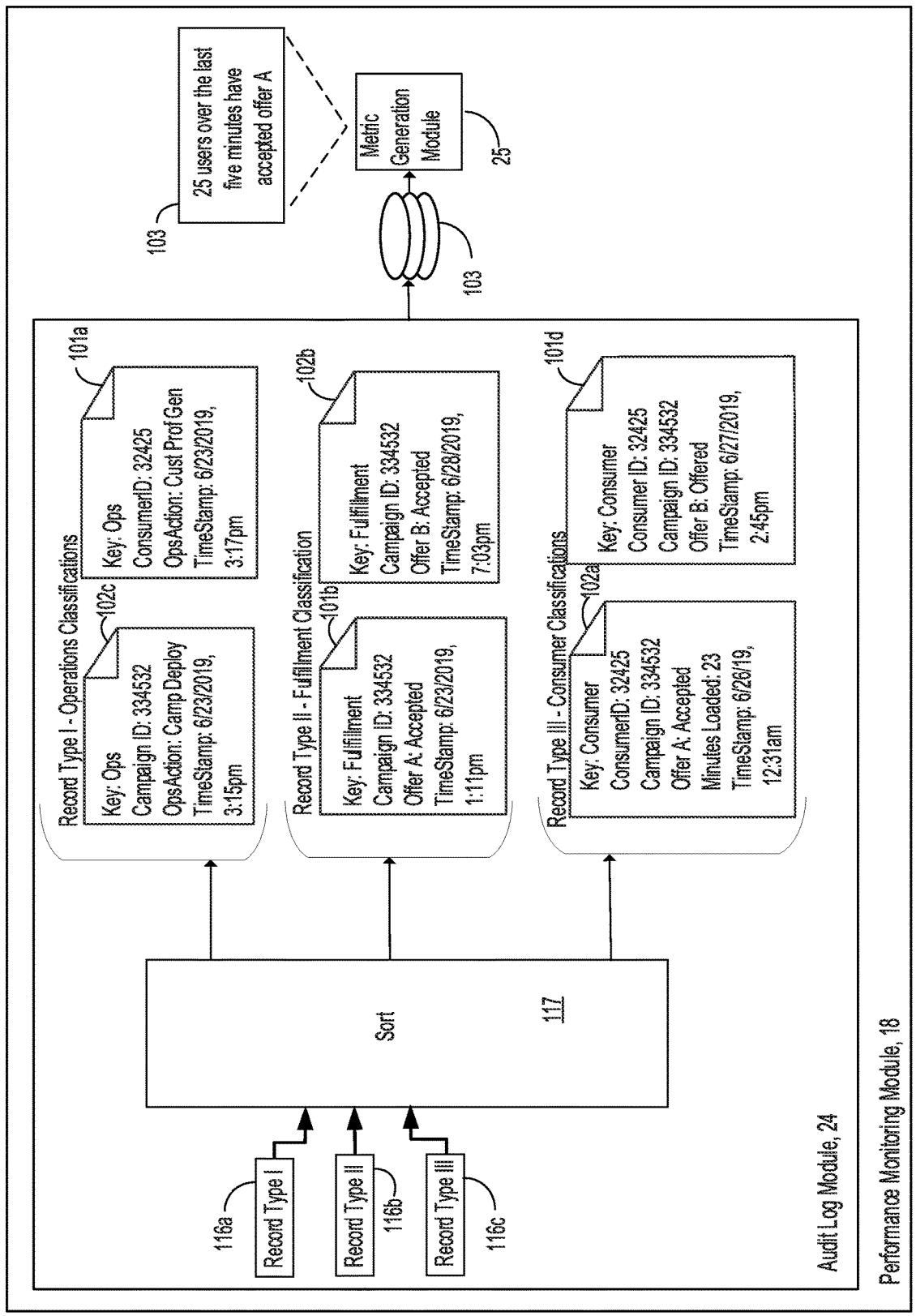

Referring to FIG. 5A, an example of classified of audit records is shown. In this example, classifier 24*a* (which may also be the same as or different from classifier 116 in FIG. 4C) classifies various audit records by key values. In this example, audit records 101*a*, 102*c* each have the same key value of "Ops" and are therefore classified into a particular record type for "operations classification." Audit records 101*b*, 102*b* each have the same key value of "fulfillment" and are therefore classified into a particular record type for "fulfillment" classification. Audit records 101*d*, 102*a* each have the same key value of "consumer" and are therefore classified into a particular record type for "consumer" classification. Referring to FIG. 5B, each of record types 116*a*, 116*b*, 116*c* is sorted by sort component 117. In this example, audit records 101*a*, 102*c* are included in record type 116*a*. Audit records 101*b*, 102*b* are included in record type 116*b*. Audit records 101*d*, 102*a* are included in record type 116*c*. In this example, sort component 117 is configured to sort by timestamp. As such, audit records 102*c*, 101*a* in operations classifications are sorted by timestamp. Audit records 101*b*, 102*b* in fulfillment classifications are sorted by timestamp. Audit records 102*a*, 101*d* in consumer classifications are sorted by timestamp. Audit log module 24 outputs the sorted audit logs to data sink 40 for storage. In turn, metric generation module 25 can query data sink to generate metrics, e.g., for particular users, over particular time periods, for particular keys, etc. In this example, metric generation module generate metric 103.

In a variation, audit log module 24 may include a single subscribe component with a single input port, e.g., 104*a*, for receiving log records. As described in further detail below, FIGS. 4A-4D show a progression through a flowchart (as described in U.S. Publication No. US-2017-0344672, the entire contents of which are incorporated herein by reference) and illustrate that various nodes are executed in various states of the flowchart. FIGS. 6A-6D illustrate various audit records that are generated in the various states.

Figure 6A:
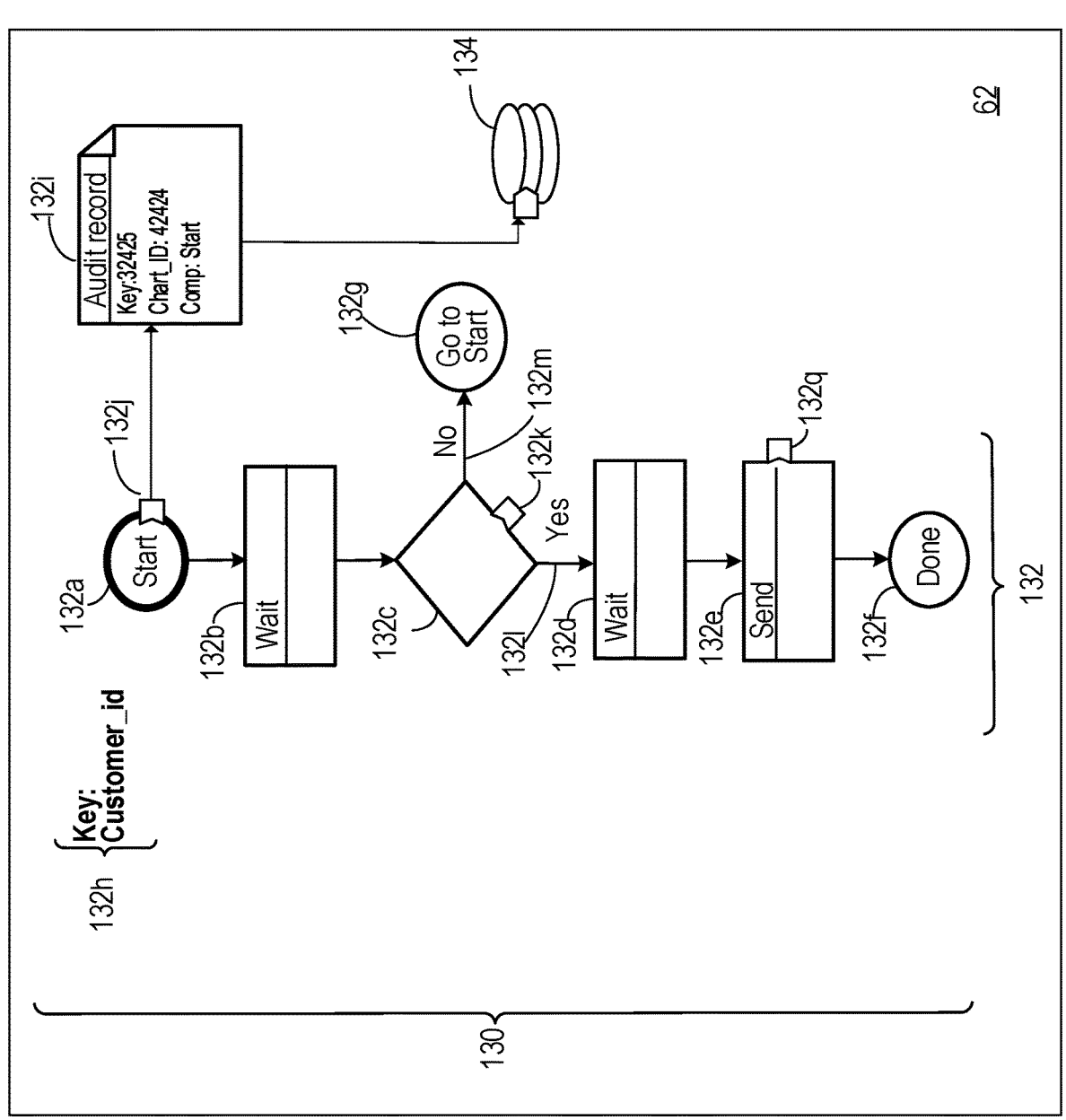
FIGS. 6A-6D are each a diagram of a flowchart.

Referring to FIG. 6A, diagram 129*a* shows system 62 executes flowchart 132 (specified by specification 130) with nodes 132*a*-132*g* representing data processing components. In this example, each of nodes 132*a*, 132*c*, 132*e* have audit ports 132*j*, 132*k*, 132*q*, respectively, for outputting one or more audit records including data (e.g., metadata) related to execution of the respective node. In this example, a specification represents executable logic and specifies various states, wherein a state of the specification specifies one or more portions of the executable logic that are executable in that state, based on a state reached from executing the executable logic on prior data items In this example, one or more of the data processing components refers to a particular grouping or portion of executable logic. Generally, a chart includes a template for processing data records. This template includes a graphic unit of logic for reacting to input data records and producing output data records, e.g., a data record generated based on logic included in a specification. A chart is an example of a specification. Generally, a graphic unit of logic includes logic that is at least partly generated graphically, e.g., by dragging and dropping various nodes from a template (not shown) to a window for building a chart. In an example, a node includes logic (not shown) that specifies how input data records are processed, how to set values for variables used by the executable logic, which output data records to generate, e.g., upon satisfaction of conditions specified by the logic, and so forth. In an example, a node is programmable by a user inputting values of parameters and/or of variables used in the logic of a node.

The chart itself is executable, as the logic in the nodes is compiled into executable logic and as each node corresponds to one or more portions of that executable logic. For example, the system transforms the specification (and/or a chart in the specification) by compiling the logic in the nodes into executable logic. Because the chart itself is executable, the chart itself is capable of processing data records and of being stopped, started and halted. The system also maintains state for flowchart 132, e.g., by tracking which one of nodes 132a-132g is currently being executed. A state of flowchart 132 corresponds to a state of executable logic represented by flowchart 132. For example, each node in flowchart 132 represents a particular state of the executable logic (in which one or more portions of the executable logic are executable in that state). When flowchart 132 is being executed for numerous values of a key, the system maintains a state of flowchart 132 for each value of the key, e.g., by maintaining state for each instance—as described in further detail below. Generally, an instance of the specification includes a specific realization of the specification for a unique value of a key, e.g., by executing executable logic represented in the specification and maintaining state of the executable logic for each unique value of the key. In this example, flowchart 132 includes a state transition diagram in which each incoming data record drives transitions between nodes and data records are evaluated based on a state reached from processing prior data records. The links between nodes in flowchart 132 represent the temporal flow of the logic.

Specification 130 also includes key 132h that identifies that flowchart 132 processes data records that include key 132h or are associated with key 132h. In this example, a custom identifier (ID) is used as the key. The key 132h can correspond to one of the fields of a data record, e.g., such as a subscriber ID field, a customer ID field, a session ID field and so forth. In this example, the customer ID field is a key field. For a particular data record, the system determines a value of a key for that data record by identifying the value of the key field for that data record. In a variation, a specification can be unassociated with a key and a flowchart can executed independent of a key.

In this example, flowchart 132 subscribes to data records (e.g., that are of a specified type and specified when flowchart 232 is configured). In this example, flowchart 132 subscribes to data records that include key 32h. In this example, flowchart 132 and the data records share a key. Generally, a flowchart subscribes to types of data records by including logic to process those data records that include the key of the flowchart. When data record processing begins, the system starts new flowchart instances for each new value of the key for that flowchart, e.g., by maintaining state of the executable logic (represented in the flowchart) for each new value of the key. Generally, a flowchart instance includes a specific realization of the flowchart for a unique value of a key, e.g., by executing executable logic represented in the specification and maintaining state of the executable logic for each unique value of the key. The system performs data record processing by configuring the flowchart instances (and thus the underlying executable logic) to respond to data records for a particular key value. In an example, a flowchart subscribes to customer short message service (SMS) data records. The flowchart instance for a particular customer ID manages data records for that customer. There can be as many flowchart instances as there are customer IDs encountered in the incoming data records.

In this example, diagram 129a illustrates a start of execution of flowchart 132. In this example, node 132a represents a start of the executable logic and is being currently executed (e.g., as indicated by the dark line around node a32a). In this example, flowchart 132 is in a state in which node 132a is being executed.

In this example, audit record 132i is generated upon execution of start node 132a. In particular, start node 132a represents a data processing component that is configured to generate on audit port 132j audit record 132i, e.g., when flowchart 132 is in a state in which start node 132a is being executed—as shown in this example. In this example, upon generating the audit record, the system populates a field of the audit record with data specifying which portion of the executable logic represented by the specification has been executed at a current time for a particular value of the key. In this example, audit record 132i has three fields: a key field (with a value of "32425" specifying a value of the key for the record currently being processing through flowchart 132), a chart ID field (populated with a value of "42424" specifying an identifier of flowchart 132) and a component ("Comp") field (populated with a "Start" value representative of node 132a). In this example, audit record 132i is output on audit port 132j to data store 134, which collect audit records. At specified time intervals (e.g., hourly), data store 134 is configured to transmit the collected audit records to audit log module 24 (FIG. 4B).

In still other examples, the specification is a chart and one or more log records specify a path through the chart that represents which portions of the executable logic are executed in processing one or more data records associated with a particular value of the key. In this example, the system generates log records that specify a path through the chart that represents which portions of the executable logic are executed in processing one or more data records associated with a particular value of the key. In yet other examples, the system generates one or more output records based on processing of one or data items. In this example, each of the one or more output records includes data not included in the log record.

Various types of audit records are predefined with various fields, each field type specifying one or more attributes of processing the data record or event. Generally, an event includes a data record (e.g., in a predefined format) that represents a particular occurrence or an absence thereof. In this example, node 132a is editable, e.g., by clicking on node 132a, which causes a configuration screen to be displayed that can be used in configuring a node and thereby also the data processing component represented by the node. Part of the configuration may include turning on auditing (or also called "logging") and specifying one or more types of audit records that are to be generated upon traversal of that node. In another example, the system described herein generates data for a user interface that displays visual representations of the various types of audit records and provides controls for turning on/off the various types of audit records. In this example, the system then generates an audit record of a type (e.g., when logging for that type of audit record is enabled)

that corresponds to or is associated with a particular type of node or data processing component. For example, audit record 132*i* is a chart start audit record for logging data specifying the start of a chart. As such, if a user specifies that a chart start audit record is enabled, then the system described herein identifies a correspondence between the chart start audit record and a start node (e.g., node 132*a*), based on the fact that a start node starts a chart and a chart start audit record logs the start of a chart, and will generate a chart start audit record.

Figure 6B:
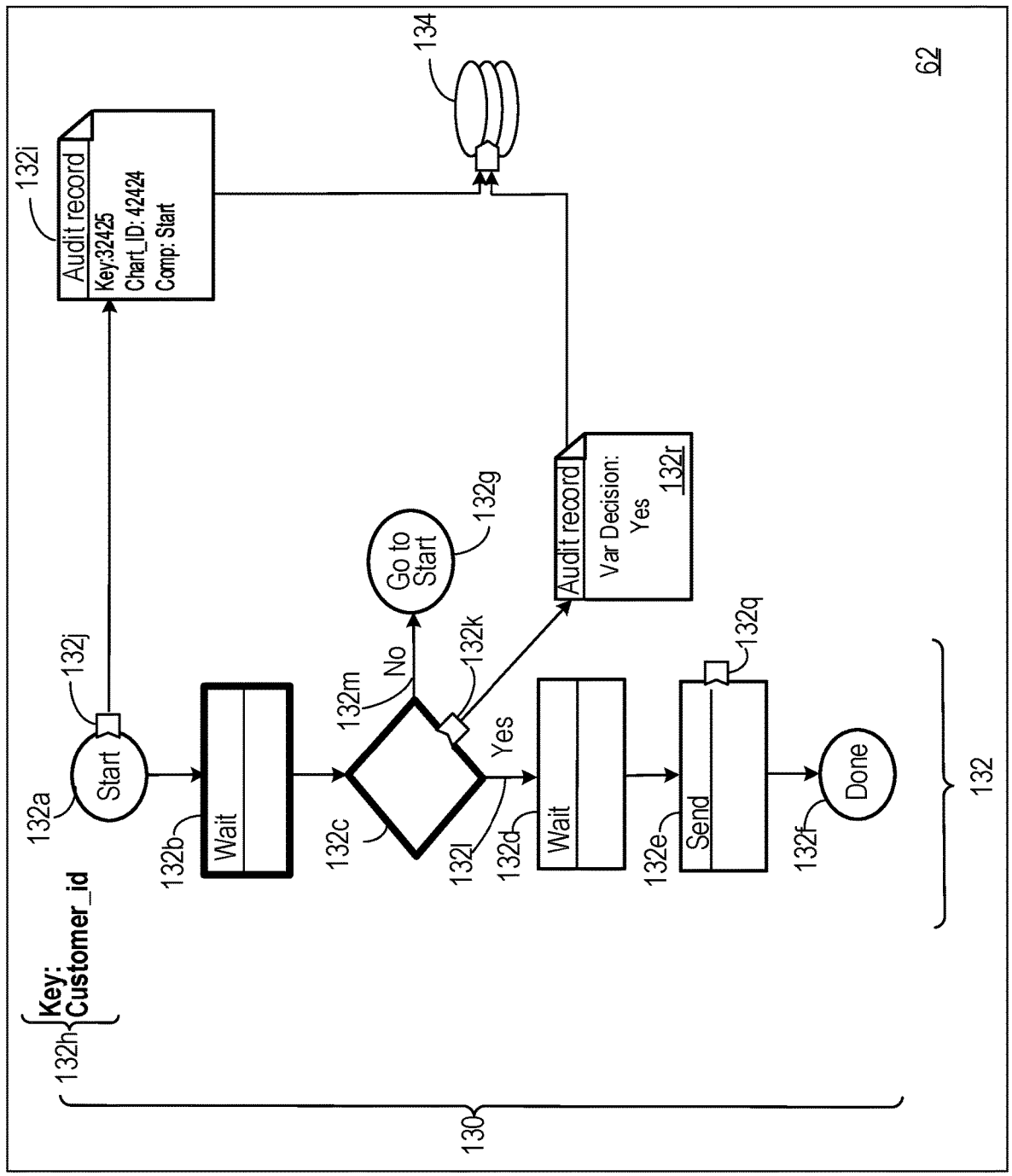

Referring to FIG. 6B, diagram 129*f* illustrates a state of flowchart 132 following completion of node 132*a*. In this example, the state of flowchart 132 transitions to node 132*b*, which represents one or more other portions of the executable logic. Node 132*b* includes a wait node (hereinafter wait node 132*b*). Wait node 132*b* represents a wait state in which a portion of executable logic (corresponding to wait node 132*b*) waits for an input data record satisfying one or more conditions. In an example, a wait state may be part of another state of flowchart 32, e.g., a state in which the system executes a wait node (to implement a wait state) and then executes one or more other nodes. Following completion of the portion of executable logic represented by wait node 132*b*, the system exits the wait state and executes node 132*c*, which represents executable logic for implementing a decision. In this example, node 132*c* includes a decision node. Hereinafter, node 132*c* is referred to as decision node 132*c*. Generally, a decision node includes a node that includes logic for execution of a decision (e.g., logic that evaluates to a Boolean value).

In this second state of flowchart 132, audit record 132*r* is generated (e.g., by execution module 16 in FIG. 1) and output on audit port 132*k* of node 132*c* to data store 134, which collected and stores audit record 132*r*. In particular, a data processing component represented by decision node 132*c* is configured to generate audit record 132*r*, e.g., when flowchart 132 is in a state in which decision node 132*c* is being executed—as shown in this example. (In this example, wait node 132*b* is also being executed in this state. However, wait node 132*b* is not configured to generate audit records).

In this example, audit records 132*r* specifies an outcome of decision node 132*c*, e.g., by specifying whether yes link 132*l* or no link 132*m* is traversed. In this example, audit record 132 stores data specifying that yes link 132*l* is traversed in a variable—"Var Decision." In a variation, an audit record may also specify variables that are read or set, e.g., upon execution of the data processing component represented by decision node 132*c*. In this example, audit record 132*r* does not need to include a key field, because audit record 132*r* is transmitted to a processing system (e.g., an internal or external computing system that processes the audit records) at specified pulses (e.g., times or pre-defined time intervals), resulting in the audit records being transmitted in a group, a block or as part of a file.

For example, the system groups audit records together by key, wherein first audit records associated with a first key are grouped into a first group and wherein second audit records associated with a second key are grouped into a second group. In this example, the audit records are grouped in memory of the system (e.g., system 14 in FIG. 1). The system groups the audit records in memory for space efficiency, so that the system does not have to replicate data across sequentially related audit records, e.g., by including the key in each audit record. Each audit record includes one or more fields indicative of one or more attributes of processing a data item. For at least one audit record, a field is a key field specifying a value of key associated with the data item. Because the audit records are grouped together by key, a subset of audit records associated with a particular key do not include the key field. In some examples, only one audit record included in a group for a particular key includes the key field. In this example, the system writes audit records in a particular group associated with a particular key to a file at an end of pre-defined time interval (e.g., pulse).

For example, the system identifies a key for the audit records in the group (which may be represented as a block or file) by parsing contents of a first audit record or a chart start audit record. Because not every audit record needs to include a key field (and other fields, such as a chart ID field, which may also be looked-up in the chart start audit record by other audit records included in a same pulse as audit record 132*i*), the system described herein is able to process audit records with a minimal impact on system resources (such as memory and processing power), relative to an impact on system resources if each audit record needs to include a key field to enable keyed logging of events. Additionally, the system described herein processes these audit records with reduced latency, because the size of the audit records is reduced due to each audit record not needing to include a key field, relative to a latency of processing audit records in which each audit record has a key field. Additionally, the system is configured to store the audit records in partitions (in memory) that are assigned to a particular key, further reducing the need for each audit record to include a key field. At the start of a new pulse, the system described herein is configured to include a key field in that first audit record for that pulse.

Figure 6C:
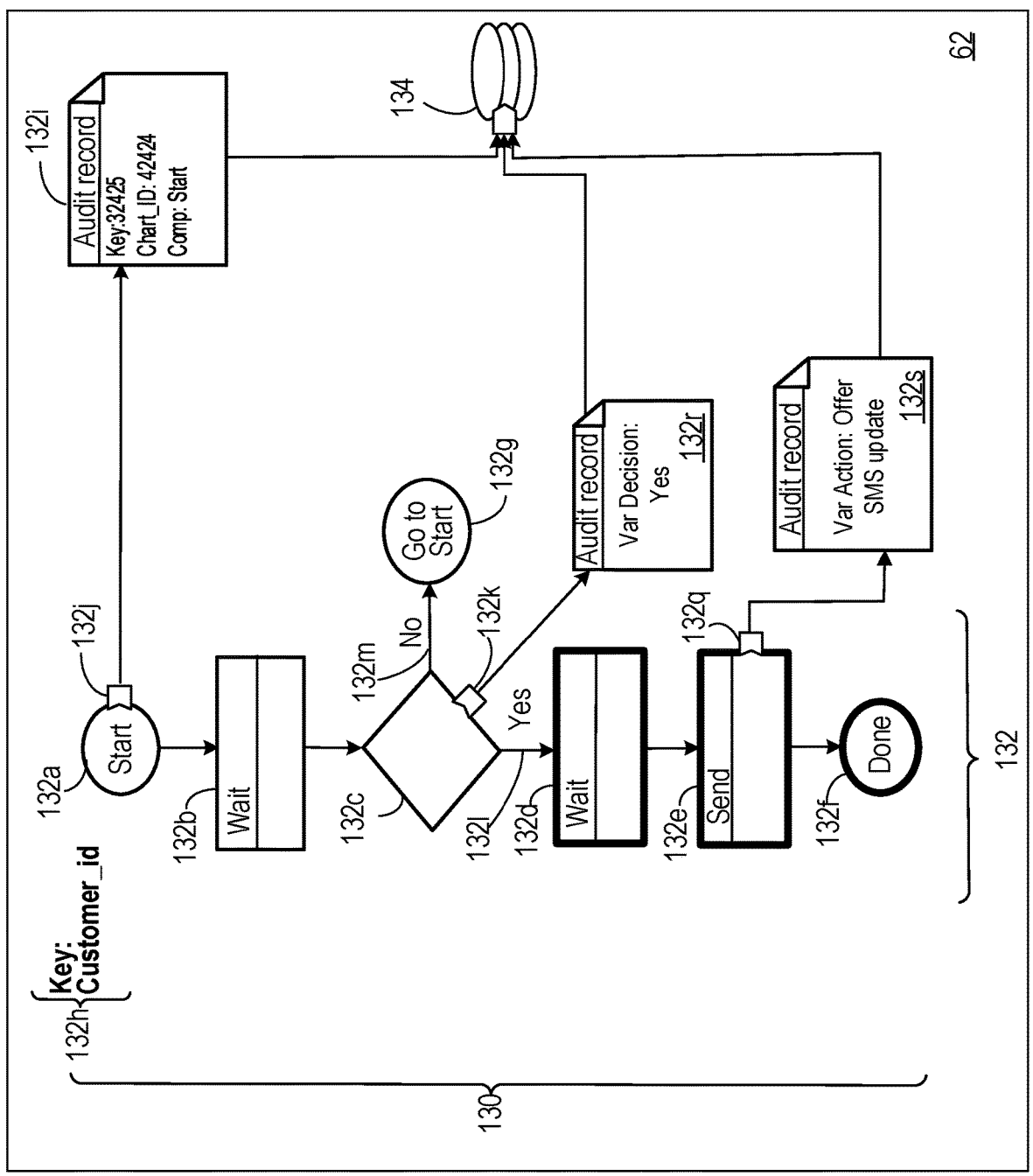

Referring to FIG. 6C, diagram 129*f* illustrates a state of flowchart 132 that is based on an outcome of the decision represented by node 132*c*. In particular, based on an outcome of the decision represented by node 132*c*, the state of flowchart 132 transitions to node 132*d*, which is another wait node. (In a variation, the state of flowchart 132 may transition to node 132*g* (which causes state to transition back to node 132*a*)). Following completion of the portion of executable logic represented by wait node 132*d*, the state of flowchart 132 transitions to node 132*e*, which includes a send node. Generally, a send node includes a node that represents executable logic for causing data transmission to another system. Following completion of execution of the portion of executable logic represented by node 312*e*, the state of flowchart 32 transitions to node 132*f,* which includes a done node. Generally, a done node represents that execution of the executable logic is complete.

In this third state of flowchart 132, audit record 132*s* is generated, e.g., by the executable logic represented by send component 132*e*. In this example, audit record 132*s* specifies an action that was implemented by the data processing component represented by send node 132*e*. Audit record 132*s* is output on audit port 132*q* of send component 132*e* and collected by data store 134. In this example, audit record 132*s* includes a variable ("Var Action"), the value of which specifies an action initiated by send component 132*e*. In this example, send component 132*e* initiates an action of sending an offer to update SMS services. As such, the value of "Var Action" is set to "Offer SMS update." As with audit records 132*g* and 132*r*, audit record 132*s* also does not need to include a key field, as audit records 132*r*, 132*s* are transmitted as part of a same pulse that includes audit record 132*g*. Others of audit records may specify a time at which an action was sent, values of variables read, values of variable set and so forth. In this example, data store 134 collects audit records 132*i*, 132*r*, 132*s* and transmits then (e.g., at specified times) to a performance monitoring module for further processing, e.g., using the techniques described herein.

Figure 6D:
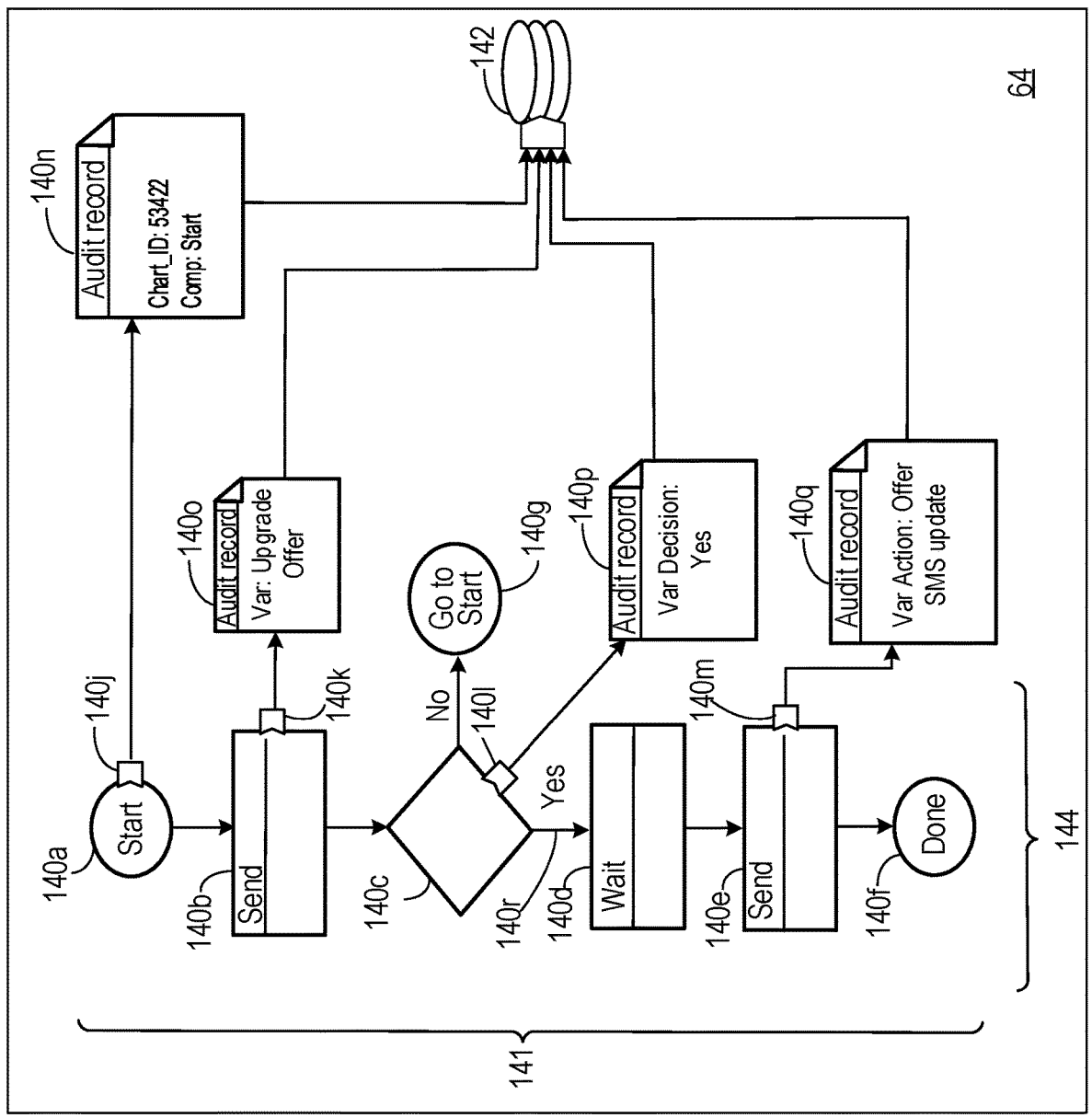

Referring to FIG. 6D, diagram 140 shows system 64 executes chart 144 (specified by specification 141) with nodes 140a-140g representing data processing components. In this example, specification 141 is independent of a key and does not only process data records that are associated with a particular keys. In this example, nodes 140a, 140b, 140c, 140e include audit ports 140j, 140k, 140l, 140m, respectively, for output of audit records. In this example, upon a start of execution of chart 144, node 140a is executed, the execution of which outputs—on audit port 140j, audit record 140n, which specifies "chart ID" and "Var Comp" fields—with values "53422" and "Start"—respectively. In this example, data store 142 receives and stores audit record 140n. Chart 144 then progresses to node 140b, execution of which sends an offer to users of the system to upgrade (e.g., telephone services). Upon execution of node 140b (e.g., upon execution of the executable logic represented by node 140b), the system generates audit record 140o, which is output on output port 140k and transmitted to data store 142.

Following execution of node 140b, node 140c is executed. Node 140c is a decision node. Execution of decision node 140c results in "yes" link 140r being traversed, which—in turn—causes the system to generate audit record 140p. In this example, audit record 140 stores a value of a variable named "Var Decision." The "Var Decision" variable specifies whether the "yes" or "no" link of node 140c was traversed. In this example, because the yes link is traversed, the value of "Var Decision" variable is set to "yes." Audit record 140p is output on audit port 140l. Data store 142 collects audit record 140p and stores it.

Following execution of node 140c, chart 144 executes nodes 140d-140f In this example, execution of node 140e generates audit record 140q, which is output on portion 140m. In this example, audit record 140q stores a value of variable (i.e., the "Var Action" variable), which specifies what action was performed or initiated by execution of the executable logic represented by node 140e. In this example, the value of the "Var Action" variable is "Offer SMS update," to specify that a user was send an offer to update SMS services. Data store 142 collects data records 140q. At specified times, data store 142 batches audit records 140n, 140o, 140p, 140q and transmits them to an audit log module.

Figure 6E:
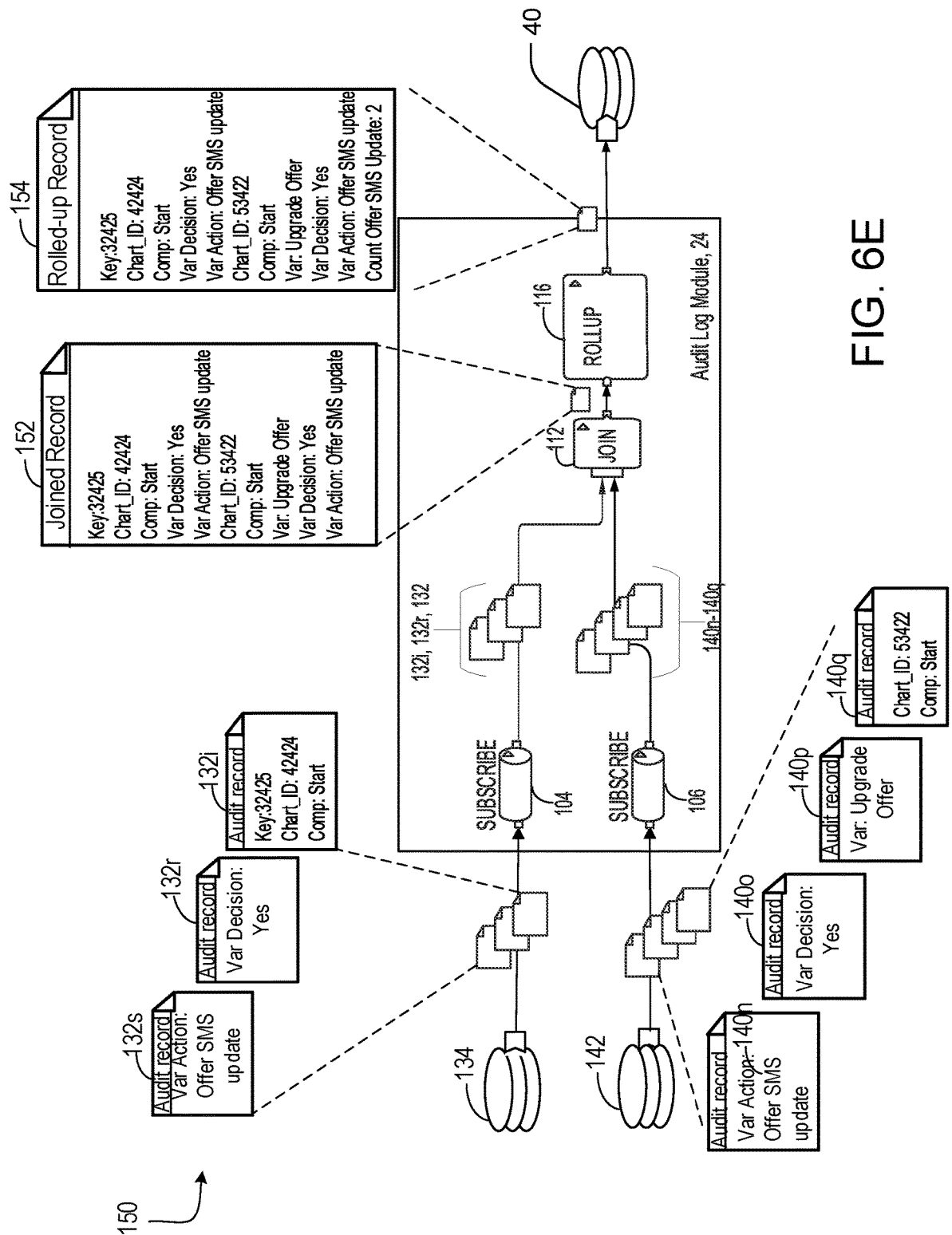

Referring to FIG. 6E, environment 150 is a variation of environment 100. In this example, subscribe component 104 reads audit records 132i, 132r, 132s from data store 134 and transmits them to join component 112. Subscribe component 104 reads audit records 140n-140q from data store 142 and transmits them to join component 112. In this example, join component 112 joins the contents of audit records 132i, 132r, 132s and audit records 140n-140q into joined audit record 152. Join component 112 outputs joined audit record 152 to rollup component 116, which in turn performs a rollup operation on one or more values of one or more respective fields in joined audit record 152 to generate rolled-up record 154. In this example, rolled-up record 154 includes an aggregate field, i.e., "Count Offer SMS Update." This field specifies the number of variables with a value of "Offer SMS update." In this example, joined record 152 includes two variables (both named "Var Action") with a value of "Offer SMS update." As such, the value of the aggregate field "Count Offer SMS Update" is "2." Rollup component 116 transmits rolled-up record 154 to data store 40 for further processing, e.g., for generation of metrics—as described herein.

Figure 7:
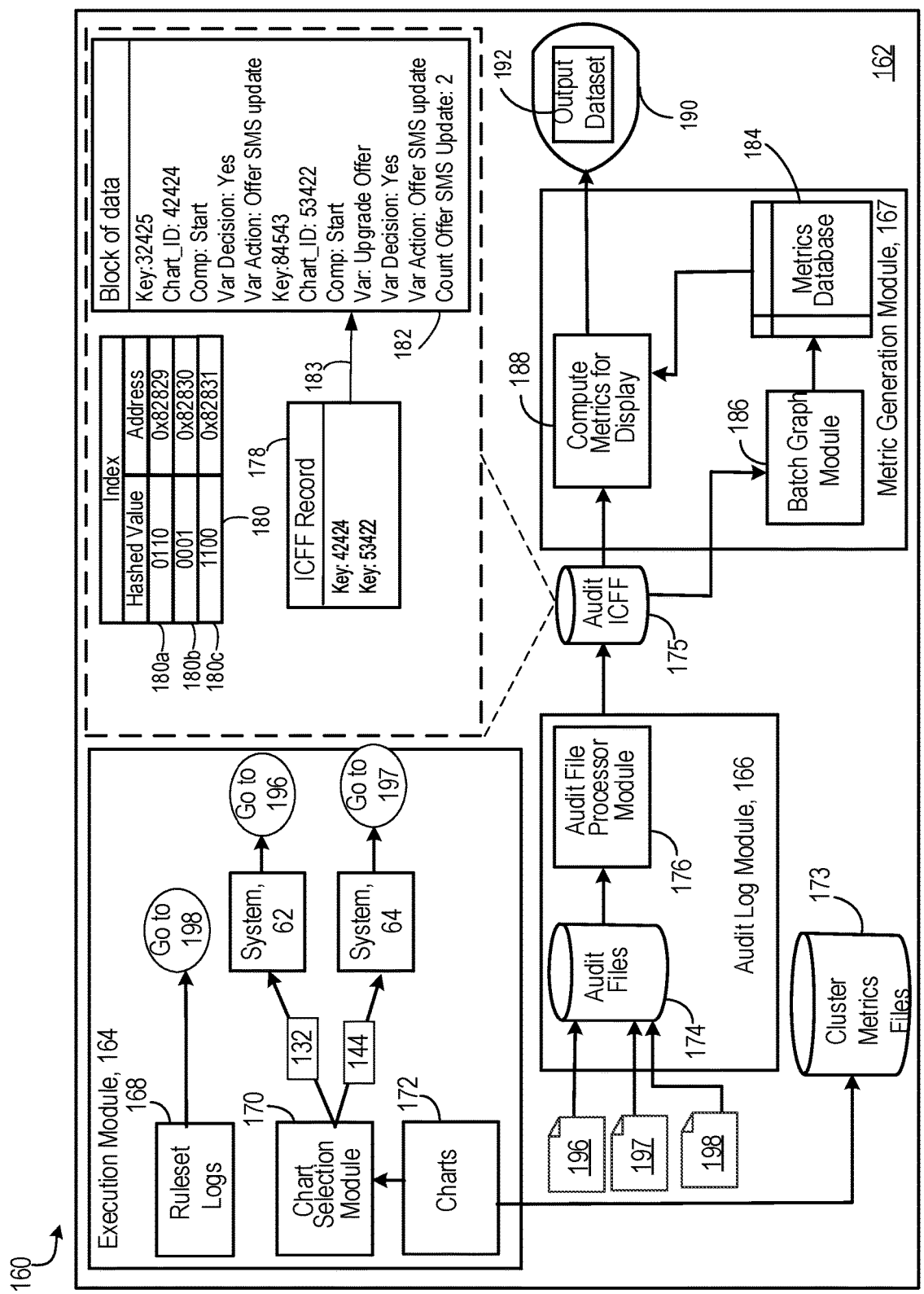

Referring to FIG. 7, environment 160 illustrates an architecture for audit logging. Environment 160 includes system 162 (e.g., a data processing system) with execution module 164, which is configured to process data records (and/or other structured data items). In this example, execution module 164 includes ruleset logs 168, chart selection module 170 and charts 172. System 162 also includes audit log module 166 and metric generation module 167. In this example, ruleset logs 168 includes logs (e.g., logging data or rule case trace information (also referred to herein as tracing information) indicative of which rules are executed, when they are executed, values of parameters and/or values set during execution and so forth) generated execution of rules in a business rules environment (BRE), as described in U.S. Pat. No. 7,877,350, the entire contents of which are incorporated herein by reference. This logging information output from ruleset logs 168 is input into data store 174, as indicated by reference number 198. In this example, execution module 164 harvests rule case trace information from the business rules environment to optionally include that information in the audit records (e.g., to account for business logic that handled by rulesets and not in chart decision blocks). In an example, the BRE implements a logging data stream by writing its logs to a port on a graph component and then writing the logs from the port to file. In this example, execution module 164 intercepts that logging data stream by replacing a function call that writes out the tracing information in the BRE with a function call that stores the tracing information in the event engine's internal data structures where the execution module 164 is collecting audit records (and other audit information) for a current event. In some example, the execution module 164 intercepts the logging data stream by providing an alternative implementation of the logging function that the BRE is using (e.g., write_to_log). In other example, the BRE supports an option to use a different function.

In this example, chart selection module 170 is configured to execute one or more dataflow graphs (e.g., one of charts 172) or is configured to select charts or dataflow graphs to run on various systems included in execution module 164. In this example, charts 172 includes dataflow graphs 66a, 66b (FIG. 4B) and charts 132 (FIG. 6A), 144 (FIG. 6D). In this example, chart selection module 170 selects, from charts 172, dataflow graphs 66a, 66b (FIG. 4B) for execution on systems 62, 64, respectively—as described in FIG. 4B. At a different, prior or subsequent time, chart selection module 170 also selects, from charts 172, charts 132, 144 (FIGS. 6A-6D) for execution on systems 62, 64, respectively—as described FIGS. 5A-5D. In this example, selection of charts 132, 144 (FIGS. 6A-6D) is shown and execution of those charts 132, 144 (FIGS. 6A-6D) on systems 62, 64—respectively is shown. In this example, the output (e.g., log records) of systems 62, 64 is transmitted to data store 174, as illustrated by reference numbers 196, 197—respectively.

In this example, one of charts 172 is an event engine graph that generates cluster metrics and writes them directly into a file in database 173. Generally, an event engine graph is a graph to monitor performance of the execution module 144. Generally, cluster metrics refer to details at an aggregate level of a system and/or the execution module 164—such as performance details, e.g., metrics indicative of which portions of a dataflow graph are traversed and aggregate metrics indicative of how many times certain portions of a dataflow graph are traversed by a group of records. In some examples, this file is appended (e.g., to other, previously stored files or updated) on every pulse (e.g., a data push), and a new file is opened each day.

In this example, another data path comes from the chart selection module 170 (e.g., based on execution of chart selection module 170 that executes charts). When charts execute, chart selection module 170 generates a stream of audit records documenting paths taken through the chart, e.g., such as wait blocks exited, flows traversed and actions sent. In this example, an audit record includes a logged activity stored either in the audit files (i.e., in database 174) or in an indexed compressed flat file (ICFF) stored in database 175. Generally, an audit file includes a file for storing various audit records. In this example, audit records are written to a file at the end of every pulse. In this example, database 174 receives one new file every pulse.

Environment 160 includes audit file processor module 176, which includes a graph that processes raw information (i.e., audit files stored in database 174) and re-formats the raw information into a format for an ICFF. In this example, database 174 transmits the audit files to audit file processor module 176 for re-formatting. In turn, audit file processor module 176 transmits the re-formatted files to database 175, which writes a re-formatted file into an ICFF record 178; indexed (in index 180) by one or more key fields (e.g., a hashed value, subject ID or key) and consolidated by time (e.g., hourly or daily). In this example, index 180 includes a "hashed value" column and an "address" column. The hashed value column includes hashed values of keys (or other data) in ICFF records that are being indexed. The address column includes database addresses of blocks of data that are referenced by the hashed values. In this example, ICFF record 178 references (e.g., via a pointer or another referencing data structure) block of data 182. In this example, while portions of the raw information are reformatted for ICFF record 178 (which is then indexed in index 180) other portions of the raw information are stored in block of data 182, which is referenced by ICFF record 178 and thereby identifiable and accessible via ICFF record 178.

In this example, audit log module 166 receives audit records 132*i*, 132*r*, 132*s* (FIG. 6E) and audit records 140*n*-140*q* (FIG. 6E) and produces rolled-up record 154, which is then transmitted to audit file processor module 176 for processing of the raw information in rolled-up data record (FIG. 6E). In particular, audit file processor module 176 re-formats the raw information in rolled-up records 154 into a format for an ICFF, e,g, ICFF Record 178. In this example, ICFF Record 178 includes the chart ID fields (i.e., from audit records 132*i*, 140*q*) as keys fields. The contents of audit records 132*i*, 132*r*, 132*s* (FIG. 6E) and audit records 140*n*-140*q* (FIG. 6E) that are not included in ICFF record 178 are included in block of data 182. The system stores ICFF record 178 and block of data 182 in database 175. In this example, database 175 stores index 180 and ICFF record 178 is indexed in index 180 by hashed values of the keys (i.e., Key: 42424 and Key: 53422) in ICFF record 178. In this example, system 162 generates the hashed value of Key: 42424 and Key: 53422 by concatenating the values of "42424" and "53422" into the following string: 4242453422, the hashed value of which is "0110"—as shown in row 180*a* of index 180. Index 180 also includes rows 180*a*-180*b* that index other ICFF records, e.g., for other audit records, e.g., at different times and/or from execution of different charts. In this example, ICFF record 178 references (as conceptually shown by arrow 183) data block 182 via address field with a value of "0x82829" as shown in row 180*a* in index 180. In a variation, ICFF record 178 references block of data 182 via a referential data structure (e.g., a pointer). In yet another variation, ICFF record 178 and block of data 182 are combined into a ICFF block of data (or a block of data) that is indexed.

In some example, the audit records and/or audit files are reformatted for the ICFF by batching audit records together at a specified granularity (e.g., one event for one subscriber for one chart), computing key fields that will be stored on an ICFF record (e.g., fields for event type, subscriber ID, timestamp, chart instance ID, etc.) and then grouping the remaining audit records together in a collection, as follows:

In an example, execution module 164 generates audit records that are optimized for space efficiency (e.g., rather than being optimized for query efficiency). In this example, the audit records are optimized for space efficiency, e.g., by not having every audit record include a timestamp, subscriber ID and so forth. To place these audit records into the ICFF, the system described herein needs to use more complete records (e.g., that include the timestamp and subject ID on every audit record) so that the system described herein can search for individual records (e.g., that are based on contents of the audit records) efficiently.

In some examples, database 175 includes a relational database, rather than an ICFF database, as the goal of implementation of database 175 is to be able to query for sequences of events. To do so, the system transforms the stream of audit records into one or more records (e.g., ICFF records). Each record includes one or more indexable/searchable key fields and a collection of data representing a remainder of the audit events.

In some examples, a level of granularity of a record is one event for one subscriber (e.g., user) for one chart. As such, the system described herein extracts (e.g., from audit files in database 174) a sequence of audit records that corresponds to one event for one subscriber for one chart. This example, the events occur sequentially. Additionally, the audit records for each event are stored sequentially in database 174 (e.g., in a file in database 174). Using the extracted audit records, the system generates a record that has a multiple key fields, e.g., including, an event type field, a subscriber ID field, a timestamp field, a chart instance ID field, and so forth. In some example, a first audit record in the sequence includes values for these multiple key fields. The system uses these included values in generating the new record. Additionally, the system constructs a block of data corresponding to remaining audit records for that sequence. The system stores that block of data as collection of data (e.g., as a Binary Large OBject (BLOB)) in database 175 as part of the generated new record or associated with the generated new record (e.g., by having the generated new record reference collection of data or blob).

Using the generated records and/or collections of data, the system can query to the ICFF (or database 175 for various information, e.g., such as, "what happened when subscriber 12345 got event 7 on June 8th?" and then display the sequence of decisions taken inside the event engine and associated rulesets for that event. In another example, the system queries the ICFF (or database 175) with the following query: "what happened when subscriber 12345 sent a message on June 8th?" In this example, to answer this query, the generated, new records includes another key field to identify that a message action was triggered (or not). As such, based on the range of queries to be supported, the system selects which key fields to include in the record.

In this example, database 175 stores raw metrics in ICFF. In this example, environment 100 also includes metrics database 184, with an interface for accessing the metrics.

System 162 produces metrics database 184 by post-processing the audit records from the ICFF, instead of reading out of memory in execution module 164. Since the ICFF 175 is not purged, the metrics database 184 can be recreated at any time including using different aggregation periods.

Therefore, metric generation module 167 includes batch graph module 186 that runs a batch graph (e.g., every 10 minutes) to aggregate the raw metrics and to write them into metrics database 184. Metric generation module 167 also includes Metrics Computation Module 188 that is run "as needed" to compute metrics (such as one or more states prevailing in system 162) for display, e.g., in user interface 190. In this example, batch graph module 186 accesses metrics from metrics database 184 and/or from database 175 and processes those accessed metrics (which in this example is output dataset 192) for display in user interface 190. In this example, the graph generated or executed by batch graph module 186 has no persistent state and a metric state is persisted in metrics database 184. As such, batch graph module 186 queries metrics database 184 for metrics for display in user interface 190. In an example, various types of user interfaces are displayed, including, e.g., a dynamic display of metrics, reports on metrics and an investigation interface, each of which are described below:

In a dynamic display of metrics, a console displays metrics (e.g., aggregate counts) and in displays updates those metrics in near-real time. The system queries metrics database 184 for this data and metrics. In this example, the console is a web user interface (UI), which includes a polling interface that can only pull data from a server (e.g., on a timer or at specified time). As such, the UI (e.g., web page) intermittently queries the server for updated counts to display. The updated counts will be stored in the metrics database 184. In this example, there is server side logic to interface between the UI (web page) and the metrics database 184, including, e.g., a Java application server sitting between a browser and the database.

In another example, user interface 190 displays reports on the metrics queried from metrics database 184. In this example, users will be able to look at the metrics in reports and dashboards. The metrics specify how many people enter each campaign, how many people traversed each branch (e.g., of a chart), how many people got an offer, how many people accepted the offer, etc. The user interface includes controls to "drill down" to more details in this report. To drill down (e.g., to answer a query of "what happened for these 10 subjects who saw the trigger event but did not get the offer"), the system accesses the records in the ICFF in database 175. To implement these reports, the system implements a service side module (which in this example is batch graph module 186), which can access metrics database 184 and database 175 when there is drill down.

In still another example, user interface 190 includes an investigation interface, in which users can ask questions, such as "what happened when subscriber 12345 got event 7 on June 8th?" To answer these questions, the system queries the ICFF (e.g., in database 175)—using a server side module (e.g., Java, a graph and so forth) between user interface 124 and the ICFF in database 175.

Execution module 164 creates multiple different types of audit records to store in an ICFF in database 175. The below Table 1 specifies the different types of audit records, with their corresponding fields. Some of the below audit record types are optional depending on the level of logging. In this example, an ICFF stores a list of fields, corresponding the fields shown in the below Table 1, e.g., for use in generating the key fields of the ICFF record—as described above. Values for fields that are italicized in the below Table 1 are not generated by the execution module 164, but are inferred by the system described herein by looking backwards through the audit stream when data is written into the ICFF. This means that the execution module 164 needs to generate significantly less data. In the below Table 1, the "?" column indicates whether the audit record is optional. A "+" sign means the audit record is generated by execution module 164. A letter means that the audit record is optionally generated and is controlled by a set of related control points and an asterisk indicates that that record type is enabled by default.

TABLE 1

| Name | Fields | ? | Details |
| --- | --- | --- | --- |
| Event seen | timestamp, protocol_version, subject_id, event_type, actual_time, source_time, arrival_time | + | This is the first event in a sequence. The event engine generates this record type when the event engine first sees the event or alarm for a subscriber. It may be followed by processing for multiple charts. The event type can be −1, which means alarms are being processed by the event engine. The protocol_version provides a way to change the semantics of the audit sequence. The timestamp is the logical time. It will apply to all the events in the rest of the sequence. Actual_time is physical time. Source_time is the best estimate of the time when the event was created at the source. Arrival_time is when the event was first collected by the system. |
| Processing time | *timestamp, subject_id, event_type,* processing_time | + | At the end of processing an event or a series of alarms, this is the total time spent doing processing of that event/alarms. This is the last audit record in a sequence that starts with Event seen. |
| Chart registered | *timestamp,* subject_id chart_version, chart_name, source_rpath, chart_hash | + | Whenever the event engine registers a chart, or changes a chart registration. Chart_version is a computed hash of (chart_name, source_rpath, chart_hash). |
| Chart start | *timestamp,* subject_id instance_id, | + | This audit record type specifies when a chart instance starts. |

TABLE 1-continued

| Name | Fields | ? | Details |
|---|---|---|---|
| Alarm dispatch | chart_version, monitoring_name *timestamp, subject_id, instance_id, alarm_time* | + | The system generates this audit record when an alarm is seen for a subscriber, for a chart. |
| Event dispatch | *timestamp, subject_id, instance_id, block_name* | + | This audit record is generated by the sytem when a chart is waiting for an event and that event occurs. This does not necessarily mean that the wait conditions were satisfied. |
| Chart done | *timestamp, subject_id, instance_id, time_started* | + | This audit record type specifies that a chart is dropped. In this example, the instance_id represents the chart being dropped, not the chart doing the dropping (which may be the chart manager). The time_started is the timestamp on the corresponding chart start audit record (which may have been days or weeks ago). |
| Block entered | *timestamp, subject_id, instance_id, block_name* | + | When a wait block is entered with or without a timeout. |
| Action sent | *timestamp, subject_id, instance_id, block_name, action_type* | + | This type of audit record specifies when an action is sent (e.g., as part of a campaign). |
| Block exit - event | *timestamp, subject_id, instance_id, block_name, time_entered* | + | The event engine generates this type of audit record when a block is exited. The time entered is the time stamp of the corresponding Block entered audit record (which may have been days ago). |
| Block exit - alarm | *timestamp, subject_id, instance_id, block_name, time_entered* | + | The system generates this audit record, when a block (e.g., a graph component) is exited. |
| Decision taken | *timestamp, subject_id, instance_id, block_name, block_result* | D* | When a decision block is tested. The result is the result of the decision, which determines which link is taken. |
| Monitoring point | *timestamp, subject_id, instance_id, point_name, point_value* | P* | Each monitoring point (which are associated with links) has a condition and an expression. The event engine generates an audit record when the condition is true, then the event engine computes the expression and records the resulting value. |
| Ruleset called | *timestamp, subject_id, instance_id, ruleset_name* | R | This audit record type specifies when a ruleset is about to be called by the event. |
| Rule event | *timestamp, subject_id, instance_id, ruleset_name,* opCode, group, index, nullFlag, value | R | When a ruleset is called from a chart, the event engine converts ruleset audit events into an audit record. |
| Variable set | *timestamp, subject_id, instance_id, variable_name, variable_value* | S | When the event engine sets either a shared variable or a chart instance variable. |
| Variable read | *timestamp, subject_id, instance_id, variable_name, variable_value* | V | When the event engine reads either a shared variable or a chart instance variable. |
| Monitoring point | *timestamp, subject_id, instance_id, point_name, point_value* | P* | Each monitoring point (which are associated with links) has a condition and an expression. The event engine generates an audit record only when the condition is true and computes the expression and records the resulting value. |

TABLE 1-continued

| Name | Fields | ? | Details |
| --- | --- | --- | --- |
| Error dispatch | timestamp, subject_id, instance_id, error_message, not_handled | + | This audit record type indicates that an error occurred while executing the chart. |

In an example, database 174 groups (e.g., continuously or intermittently) audit records for each subject (e.g., by key). That is, the audit records are automatically grouped by subject or key. As a result, execution module 164 does not need to duplicate the timestamp, subject_id or instance_id in each audit record in the audit file (e.g., per pulse). Rather, database 174 can obtain values from these fields based on previously occurring values of these fields in the group. In this example, no state needs to be preserved between pulses. This means, for example, that block exit audit records need to have the block_name since the block entry audit record may have been many pulses ago. In the database 174, audit records will be complete with relevant fields shown in the foregoing Table 1.

In an example, the system detects an occurrence of an event for a subject (e.g., a user or a subscriber) for a chart. As such, execution module 164 generates an "event seen" audit record, then an "event dispatch" audit record and then a "block exit—event" audit record. From these audit records, the system (e.g., or audit file processor module 176) obtains values for the following fields: event_type, timestamp, and instance_i. In this example, the systems collects these audit records together in one blob, and the key fields (e.g., of event_type, timestamp and instance_id) are set, by the system, in another record (e.g., an ICFF record) from the data seen (e.g., from the audit records).

In another example, a timeout happens for a subject for a chart. In this example, execution module 164 generates the following audit records: an "event seen" audit record of type alarm, then an "alarm dispatch" audit record and then a "block exit—alarm" audit record. From these audit records, the system determines values for the following key fields: the event_type, timestamp, and instance_id. In this example, the system determines a value of the instance_id field from the block exit—alarm audit record, e.g., rather than inferring a value of that field. In this example, the system collects these audit records in a blob and the key fields (e.g., event_type, timestamp, instance_id, etc.) are set by the system from the data seen (e.g., the audit records).

In still another example, an event happens for a subject that starts a chart. In this example, the execution module 164 generates an "event seen" audit record (which may be of type start chart or may be of another type), then an "event dispatch" audit record and then a "chart start" audit record. From these audit records, the system obtains values for the following key fields: event_type, timestamp, and instance_id. The system collects the audit records in a blob and the key fields (of event_type, timestamp, instance_id, etc.) are set from the data seen (e.g., the audit records).

Because the audit records are grouped together by key, a subset of audit records associated with a particular key do not include the key field. For example, database 174 or audit file processor module 176 may receive the following sequence of audit records: an event seen audit record, an event dispatch audit record, a block exit—event audit record. In this example, database 174 or audit file processor module 176 obtains the subject ID (e.g., the key) from the event seen audit record. As such, the execution module 164 does not need to duplicate the key in the event dispatch and block exit audit records, since these audit records will be sequential in memory (e.g., in database 174 or other system memory) after the event seen audit record. Similarly, the event dispatch audit record include the instance ID field. As such, the event engine does not need to copy of include this field in the block exit audit record. Since, the system groups audit records memory (and on disk), the system does not need to copy the key across all audit records in a group, thereby conversing system resources and reducing an amount of memory consumption.

To avoid generating excessive amounts of data, users have control over when the event engine generates audit records and which audit records are generated. Although auditing (and therefore metrics) can be turned off entirely, if auditing is turned on, then the core set of audit records (marked with a plus sign in the earlier table) are not disabled. The core set of audit records tracks event engine inputs (events and alarms), outputs (actions), errors and chart and wait block activity. Generally, an alarm includes a predefined type of data record (e.g., that a chart sends itself) that arrives at a pre-calculated time in the future. The other audit record types can be selectively enabled and disabled. There are two dimensions to enabling optional audit records—what should be enabled and when it should be enabled. For the what, there are a number of distinct groups of audit records that can be selectively enabled/disabled. They include:

A: Alarm set (on by default)
    D: Decision taken (on by default)
    P: Monitoring point (on by default)
    R: Ruleset called and Ruleset event
    S: Variable set
    V: Variable read
    L: Lookup access and Lookup variable For the when, logging of these audit events can be enabled for everything or limited based on one or more of the following:

Only for a specified set of subject ids (e.g., keys)
    Only for a specified set of chart named and/or monitoring names
    Only for a specified set of event types (e.g., record types)

In an example, the execution module 164 configures the logging of these audit records through control points. Generally, a control point includes a run-time parameter that is defined by a user (generating a chart) and is used to change the behavior of one or more charts (or chart instance) at run-time. In this example, audit records are controlled (e.g., by the event engine) by a set of four interrelated control points. The five control points are:

Audit Types—This is a list of the audit record types to be turned on—using the letters listed in above Table 1.
    Audit Entities—This is a list of subject ids. If not blank, then the event engine will only generate the audit record types in the Audit Types list for subject ids included in this list. (Otherwise, all subject ids will be audited).

Audit Events—This is a list of event types (e.g., numbers corresponding to or representing event types). If not blank, then the event engine will only generate audit record types in the Audit Types list for types of events included in this list. (Otherwise, all events will be audited). There are various types of events, including, e.g., an event specifying that an SMS message was sent, an event specifying that a user renewed a mobile plan, and so forth.

Audit Charts—This is a list of chart names and monitoring names. If not blank, the event engine will generate audit record types in Audit Types for charts whose chart name or monitoring name is included in this list. (Otherwise, all charts will be audited).

Audit Variables—This includes a comma separated list of variable names. If not blank and the event engine is configured to generate audit record types for variables (e.g., variable set or variable read), then the event engine will only generate an audit record if the variable name is in this list.

In some examples, the execution module 164 applies different rules to different groups of audit records. In this example, there is a first group of audit records (e.g., a first audit group) with a first set of rules (e.g., Audit Types 1, Audit Entities 1, Audit Events 1, Audit Charts 1 and Audit Variables 1) and a second group of audit records (e.g., a second audit group) with a second set of rules (e.g., Audit Types 2, Audit Entities 2, Audit Events 2, Audit Charts 2 and Audit Variables 2), and so forth.

In this example, each of the audit types, audit entities, audit events, audit charts and audit variables include a type of filter. If any or all of these filters are set, then only a subset of the events will have extra auditing (e.g., auditing that includes optional forms of auditing).

In an example, the system is configured for minimal auditing by implementing a first audit group, as follows:

Audit Types 1=" " (enable nothing optional)
Audit Entities 1=" " (all subject IDs)
Audit Events 1=" " (all event types)
Audit Charts 1=" " (all charts)
Audit Variables 1=" " (all variables, although this is ignored since the system is configured to turn off optional variable logging).

Now, in another example, system is configured to assess why an offer to subject_ID 12345 is never sent, even though this subject number meets all the criteria for sending the offer. The chart that implements this offer is "My Offer Chart" and the triggering event is number 6. To get all lot more details for this particular subject ID about why the offer is not sent, the system is configured with a second audit group, as follows:

Audit Types 2="ADPRSVL" (enables all audit types)
Audit Entities 2="12345" (only this subject ID)
Audit Events 2="6" (only this event type)
Audit Charts 2="My Offer Chart" (only this chart)
Audit Variables 2=" " (all variables).

In this example, when an event occurs, the system first checks to see if the subject ID is in the list of Audit Events 2 and the event type is in the list of Audit Events 2 and the chart is in the list of Audit Charts 2. If all of these attributes (e.g., filters) evaluate to true, the system implements all audit record types as specified in Audit Types 2, which will start optional logging for the duration of that event. If not, the system implements Audit Types 1, which just logs the default. In this example, the system is configured to check a highest numbered group first and work backwards until a matching group is found. If no matching group is found, the system implements and uses defaults. In a variation, the system may be configured to take a union of all matching groups that add more optional logging.

In this example, the execution module 164 implements condition audit logging (e.g., via implementation of a monitoring point audit record) and optimizes its execution performance. To optimize this performance, the execution module 164 pre-calculates (e.g., pre-generates) data structures for making conditional audit decisions. Generally, a conditional audit decision specifies that an audit record is generated what a condition evaluates to a specified value (e.g., true or false). In this example, the event engine does the conditional audit calculations at the beginning of event processing for an event or alarm. For example, the event engine performs the calculation (e.g., in the above described audit groups) every time the event engine detects an event or an alarm—but only at the beginning of processing of each event or alarm (e.g., rather than on every audit record). The event engine saves the conditional audit calculations in a package of global variables and queries inside each of the auditing functions that can be conditional.

For each audit record type, the execution module 164 implements a single flag that specifies whether audit records for that audit record type are being generated. The execution module 164 analyzes contents of the Audit Entities and Audit Events lists in implementing the single flag, since both of these lists are specified or generated when the event processing starts. Because one event can be processed by many charts, the event engine determines, per chart, whether an audit function (e.g., audit record type) is being implemented. If Audit Charts is not blank, the event engine will convert contents of the Audit Charts into a list of instance ids (that each identify a chart) to simplify comparison among an id of a chart that is being implemented and the instance ids that specify which charts are generating audit records (and which types of audit records).

In an example, the execution module 164 collects the audit records in an array in memory (e.g., either in the execution module 164 or in a system that includes execution module 164) and then writes the audit records out to the audit file in one block at the end of processing of an event or a stream of events. In this example, audit records from different events (i.e., events associated with different keys or user IDs) are not intermixed in memory. Rather, the memory is partitioned and each partition had its own audit file. As such, the execution module 164 is configured to automatically group audit records together by key.

In this example, the audit file is versioned. There will be one instance of the audit file for each pulse. The audit files will accumulate on disk and an audit file processing graph (executed by or audit file processor module 176) will pick up each audit file (from each partition) at the end of the pulse and post-process the audit records, writing them into the ICFF.

In this example, the system generates metrics database 184 by post-processing the audit records from the ICFF (in database 175), e.g., rather than reading the audit records from memory in the execution module 164. In this example, ICFFs are not purged. As such, the metrics database 184 can be recreated at any time including using different aggregation periods. In this example, a table in metrics database 184 has a cluster_name column such that one database can be used for multiple clusters. Generally, a cluster includes an event engine instance. Generally, an event engine instance includes a specific realization of one or more specifications (for which one or more charts are executed by execution module 164) for a unique value of a key. That is, each subject ID is handled by exactly one event engine instance. So, for each unique key (e.g., subject ID), there will be exactly one event engine instance that has all of its charts. Audit records for a same cluster will have the same value of cluster_name.

In this example, metrics database 184 can be queried for metrics that are indicative of a state of execution module 164—such as a total number of events processed by the execution module 164 (e.g., based on the event seen audit records), a number of events that resulted in an error (e.g., based on the error dispatch audit records), a number of events that trigger a campaign (e.g., based on the action sent audit records), which subscribers move from one stage to another stage for a particular campaign (e.g., based on the block entered audit records), a number of subscribers that were canceled or added in the event engine for a particular day (e.g., based on the chart start and chart done audit records), a number of total charts that are running in the event engine (e.g., based on the chart start audit record) and that track a state of the execution module 164 as events are being processed by the event engine.

Additionally, the metrics database 184 can be queried (e.g., by a client device or the system described herein) to retrieve data specifying reasons that messages were not sent for a particular key (e.g., for each subscriber). To do so, the event engine is configured to log links taken (and/or components executed within a chart) and ruleset cases accessed and implemented via the execution module 164 (e.g., by producing audit records specifying which components and/or links are executed). The system is then configurable to compare a path through a chart that is taken (e.g., as specified by the audit records) to all potential paths through a chart to determine why a particular message was not sent (e.g., because a path corresponding to the message being sent was never traversed because an alternate path was traversed—as specified by the audit records).

Figure 8:
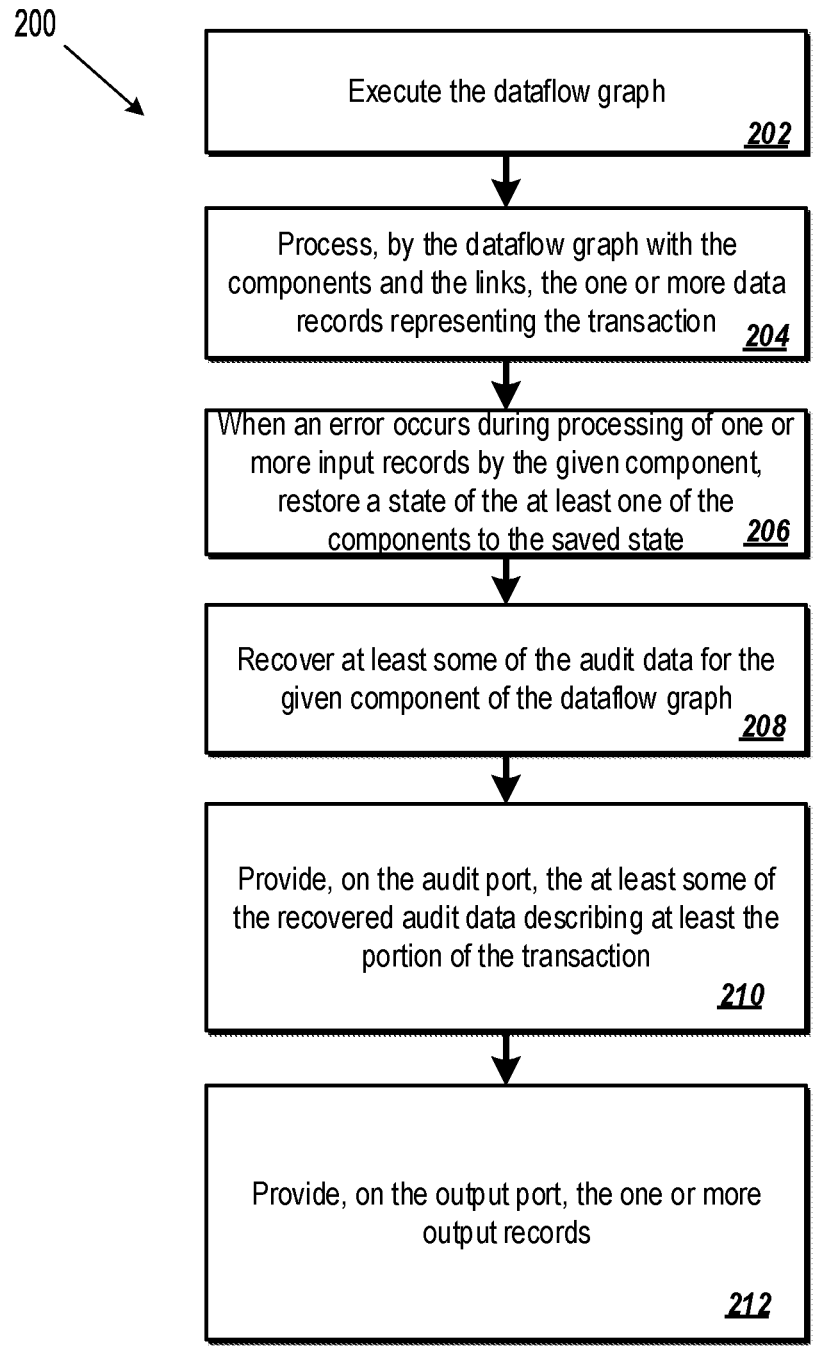
FIG. 8 is a diagram of an example process in output audit data on an audit port with recoverability.

Referring to FIG. 8, process 200 is implemented by one or more data processing systems (or processing systems) for executing a dataflow graph that processes one or more data records representing a transaction, with the dataflow graph including a plurality of components and links, with a component representing a computation applied to one or more input records to process the one or more input records, with an input record having a specified relationship to the one or more data records representing the transaction, and with the links connecting the components and representing flows of data among the components. The operation, the system executes (202) executes the dataflow graph that includes the plurality of components and the links, with a given component of the plurality including an input port, an audit port and an output port. The input port is for receiving one or more input records with a specified relationship to the one or more data records representing the transaction. The audit port is for providing audit data describing at least a portion of the transaction. The output port is for providing one or more output records. At least one of the components (e.g., component 23e in FIG. 2A) is configured to execute prior to execution of the given component (e.g., component 23j in FIG. 2A). The system processes (204), by the dataflow graph with the components and the links, the one or more data records representing the transaction, wherein the at least one of the components saves a state specifying one or more input records that are processed by the at least one of the components. When an error occurs during processing of one or more input records by the given component, the system restores (206) a state of the at least one of the components to the saved state. Based on the restored state, the system recovers (208) at least some of the audit data for the given component of the dataflow graph. The system provides (210), on the audit port, the at least some of the recovered audit data describing at least the portion of the transaction. The system provides (212), on the output port, the one or more output records.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of charts and flowcharts. The nodes, links and elements of the chart can be implemented as data structures stored in a computer readable medium or other organized data conforming to a data model stored in a data repository.

The techniques described herein can be implemented in digital electronic circuitry, or in computer hardware, firmware, software, or in combinations thereof. An apparatus can be implemented in a computer program product tangibly embodied or stored in a machine-readable storage device (e.g., a non-transitory machine-readable storage device, a machine-readable hardware storage device, and so forth) for execution by a programmable processor; and method actions can be performed by a programmable processor executing a program of instructions to perform functions by operating on input data and generating output. The embodiments described herein, and other embodiments of the claims and the techniques described herein, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments of the invention have been described. Nevertheless, it will be understood by one of ordinary skill in the art that various modifications may be made without departing from the spirit and scope of the claims and the techniques described herein.

What is claimed is:

1. A method implemented by a data processing system for executing a dataflow graph that processes one or more data records representing a transaction, with the dataflow graph including a plurality of components and links, with a component representing a computation applied to one or more input records to process the one or more input records, with an input record having a specified relationship to the one or more data records representing the transaction, and with the links connecting the components and representing flows of data between the components, the method including:

executing the dataflow graph that includes the plurality of components and the links, with the executing of the dataflow graph including executing a given component of the plurality of components, the given component including an input port, an audit port and an output port;

wherein the input port receives one or more of the input records with a specified relationship to the one or more data records representing the transaction;

wherein the audit port provides audit data describing at least a portion of the transaction that has taken place;

wherein the audit port stores audit data in a data sink that is distinct from a data sink that stores output from the output port;

wherein the output port provides one or more output records;

wherein at least one of the plurality of components is configured to execute prior to execution of the given component;

processing, by the dataflow graph with the plurality of components and the links, the one or more data records representing the transaction, wherein the at least one of the plurality of components saves a state specifying one or more of the input records that are processed by the at least one of the plurality of components;

when an error occurs during processing of one or more of the input records by the given component during the execution of the given component,
  restoring a state of the at least one of the plurality of components to the saved state; and
  based on the restored state, recovering at least some of the audit data for the given component of the dataflow graph;

providing, on the audit port, the at least some of the recovered audit data describing at least the portion of the transaction; and providing, on the output port, the one or more output records.

2. The method of claim 1, wherein the recovered audit data is first audit data, the audit port is a first audit port, the given component is a first component, and wherein the method further includes:

at a specified time interval, joining the first audit data with second audit data output on a second audit port of a second component.

3. The method of claim 1, wherein the given component is a first component, the recovered audit data is first audit data, and wherein the method further includes:

executing the first component on a first data processing system;

executing a second component of the dataflow graph on a second data processing system; and receiving, on a third data processing system, the recovered audit data and second audit data output from a second audit port of the second component.

4. The method of claim 3, further including:

storing in memory the received recovered and second audit data; and dynamically generating, from the stored audit data, one or more metrics.

5. The method of claim 1, further including:

aggregating data from first and second audit data; and storing the aggregated data.

6. The method of claim 1, further including:

classifying the recovered audit data by assigning the recovered audit data to a particular classification; and generating, from audit data assigned to the particular classification, audit metrics indicative of a user's interaction with a particular campaign.

7. The method of claim 1, wherein, in response to the occurrence of the error, the given component outputs, on an error log port, an error log, which includes the state of the at least one of the plurality of components and specifies which one or more of the input records were last successfully processed by the at least one of the plurality of components, wherein the state specifies which of the components last successfully finished processing.

8. The method of claim 7, wherein the given component outputs the error log to an error handler component, wherein the error handler component transmits to a rollback component a message based on the error log, and wherein the rollback component, using the message, returns a state of the dataflow graph to a state in which the at least one of the plurality of components is being executed and in which the one or more of the input records that were last successfully processed by the at least one of the plurality of components are being processed by the at least one of the plurality of components.

9. One or more machine-readable hardware storage devices for executing a dataflow graph that processes one or more data records representing a transaction, with the dataflow graph including a plurality of components and links, with a component representing a computation applied to one or more input records to process the one or more input records, with an input record having a specified relationship to the one or more data records representing the transaction, and with the links connecting the components and representing flows of data among the components, the one or more machine-readable hardware storage devices storing instructions that are executable by one or more processing devices to perform operations including:

executing the dataflow graph that includes the plurality of components and the links, with a given component of the plurality including an input port, an audit port and an output port;

wherein the input port receives one or more of the input records with a specified relationship to the one or more data records representing the transaction;

wherein the audit port provides audit data describing at least a portion of the transaction that has taken place;

wherein the audit port stores audit data in a data sink that is distinct from a data sink that stores output from the output port;

wherein the output port provides one or more output records;

wherein at least one of the plurality of components is configured to execute prior to execution of the given component;

processing, by the dataflow graph with the plurality of components and the links, the one or more data records representing the transaction, wherein the at least one of the plurality of components saves a state specifying one or more of the input records that are processed by the at least one of the plurality of components;

when an error occurs during processing of one or more of the input records by the given component during the execution of the given component, restoring a state of the at least one of the plurality of components to the saved state; and based on the restored state, recovering at least some of the audit data for the given component of the dataflow graph;

providing, on the audit port, the at least some of the recovered audit data describing at least the portion of the transaction; and providing, on the output port, the one or more output records.

10. The one or more machine-readable hardware storage devices of claim 9, wherein the recovered audit data is first audit data, the audit port is a first audit port, the given component is a first component, and wherein the operations further include:

at a specified time interval, joining the first audit data with second audit data output on a second audit port of a second component.

11. The one or more machine-readable hardware storage devices of claim 9, wherein the given component is a first component, the recovered audit data is first audit data, and wherein the operations further include:

executing the first component on a first data processing system;

executing a second component of the dataflow graph on a second data processing system; and receiving, on a third data processing system, the recovered audit data and second audit data output from a second audit port of the second component.

12. The one or more machine-readable hardware storage devices of claim 11, wherein the operations further include:

storing in memory the received recovered and second audit data; and dynamically generating, from the stored audit data, one or more metrics.

13. The one or more machine-readable hardware storage devices of claim 9, wherein the operations further include:

aggregating data from first and second audit data; and storing that aggregated data.

14. The one or more machine-readable hardware storage devices of claim 9, wherein the operations further include:

classifying the recovered audit data by assigning the recovered audit data to a particular classification; and generating, from audit data assigned to the particular classification, audit metrics indicative of a user's interaction with a particular campaign.

15. A data processing system for executing a dataflow graph that processes one or more data records representing a transaction, with the dataflow graph including a plurality of components and links, with a component representing a computation applied to one or more input records to process the one or more input records, with an input record having a specified relationship to the one or more data records representing the transaction, and with the links connecting the components and representing flows of data among the components, the system comprising one or more processing devices; and one or more machine-readable hardware storage devices storing instructions that are executable by the one or more processing devices to perform operations including:
- executing the dataflow graph that includes the plurality of components and the links, with a given component of the plurality including an input port, an audit port and an output port;
- wherein the input port receives one or more of the input records with a specified relationship to the one or more data records representing the transaction;
- wherein the audit port provides audit data describing at least a portion of the transaction that has taken place;
- wherein the audit port stores audit data in a data sink that is distinct from a data sink that stores output from the output port;
- wherein the output port provides one or more output records;
- wherein at least one of the plurality of components is configured to execute prior to execution of the given component;
- processing, by the dataflow graph with the plurality of components and the links, the one or more data records representing the transaction, wherein the at least one of the plurality of components saves a state specifying one or more of the input records that are processed by the at least one of the plurality of components;
- when an error occurs during processing of one or more of the input records by the given component during the execution of the given component,
  - restoring a state of the at least one of the plurality of components to the saved state; and
  - based on the restored state, recovering at least some of the audit data for the given component of the dataflow graph;
- providing, on the audit port, the at least some of the recovered audit data describing at least the portion of the transaction; and
- providing, on the output port, the one or more output records.

16. The data processing system of claim 15, wherein the recovered audit data is first audit data, the audit port is a first audit port, the given component is a first component, and wherein the operations further include:
- at a specified time interval, joining the first audit data with second audit data output on a second audit port of a second component.

17. The data processing system of claim 15, wherein the given component is a first component, the recovered audit data is first audit data, and wherein the operations further include:
- executing the first component on a first data processing system;
- executing a second component of the dataflow graph on a second data processing system; and
- receiving, on a third data processing system, the recovered audit data and second audit data output from a second audit port of the second component.

18. The data processing system of claim 17, wherein the operations further include:
- storing in memory the received recovered and second audit data; and
- dynamically generating, from the stored audit data, one or more metrics.

19. The data processing system of claim 15, wherein the operations further include:
- aggregating data from first and second audit data; and
- storing that aggregated data.

20. The data processing system of claim 15, wherein the operations further include:
- classifying the recovered audit data by assigning the recovered audit data to a particular classification; and
- generating, from audit data assigned to the particular classification, audit metrics indicative of a user's interaction with a particular campaign.

* * * * *